(12) United States Patent
Martin

(10) Patent No.: US 9,792,684 B2
(45) Date of Patent: Oct. 17, 2017

(54) SYSTEM AND METHOD FOR IMAGING DEVICE MODELLING AND CALIBRATION

(71) Applicant: Guy Martin, Montreal (CA)

(72) Inventor: Guy Martin, Montreal (CA)

(*) Notice: Subject to any disclaimer, the term of this patent is extended or adjusted under 35 U.S.C. 154(b) by 0 days.

(21) Appl. No.: 14/898,016

(22) PCT Filed: Jul. 2, 2014

(86) PCT No.: PCT/CA2014/000534
§ 371 (c)(1),
(2) Date: Dec. 11, 2015

(87) PCT Pub. No.: WO2015/000056
PCT Pub. Date: Jan. 8, 2015

(65) Prior Publication Data
US 2016/0140713 A1    May 19, 2016

(30) Foreign Application Priority Data
Jul. 2, 2013 (CA) .................................. 2819956

(51) Int. Cl.
*G06K 9/00* (2006.01)
*G06T 7/00* (2017.01)
(Continued)

(52) U.S. Cl.
CPC .......... *G06T 7/0018* (2013.01); *G06T 3/0006* (2013.01); *G06T 5/006* (2013.01);
(Continued)

(58) Field of Classification Search
CPC ..... G06T 3/0006; G06T 5/006; G06T 7/0018; G06T 7/80; H04N 17/002; H04N 5/3572
(Continued)

(56) References Cited

U.S. PATENT DOCUMENTS 6,335,835 B1 * 1/2002 Koike .................... G02B 13/18
359/717
6,437,823 B1    8/2002 Zhang
(Continued)

FOREIGN PATENT DOCUMENTS

CN    101065969    10/2007
CN    101727671    6/2010
(Continued)

OTHER PUBLICATIONS

Tsai, "A Versatile Camera Calibration Technique for High-Accuracy 3D Machine Vision Metrology Using Off-the-Shelf TV Cameras and Lenses", IEEE Journal of Robotics and Automation, vol. Ra-3, No. 4, Aug. 1987, pp. 323-344.
(Continued)

*Primary Examiner* — Mekonen Bekele
(74) *Attorney, Agent, or Firm* — Norton Rose Fulbright Canada LLP

(57) ABSTRACT

The invention relates to a camera modeling and calibration system and method using a new set of variables to compensate for imperfections in line of sight axis squareness with camera plane and which increases accuracy in measuring distortion introduced by image curvature caused by geometric and chromatic lens distortion and wherein the camera image plane is represented from a full 3D perspective projection.

16 Claims, 18 Drawing Sheets

(51) Int. Cl.
*H04N 5/357* (2011.01)
*H04N 17/00* (2006.01)
*G06T 3/00* (2006.01)
*G06T 5/00* (2006.01)
*G06T 7/80* (2017.01)

(52) U.S. Cl.
CPC ............. *G06T 7/80* (2017.01); *H04N 5/3572* (2013.01); *H04N 17/002* (2013.01); *G06T 2207/10024* (2013.01)

(58) Field of Classification Search
USPC .................. 382/154; 359/566, 569, 717, 794
See application file for complete search history.

(56) References Cited

U.S. PATENT DOCUMENTS

| | | | |
|---|---|---|---|
| 6,985,183 | B2 | 1/2006 | Jan et al. |
| 6,995,762 | B1 | 2/2006 | Pavlidis et al. |
| 7,023,473 | B2 | 4/2006 | Iwai et al. |
| 7,155,030 | B2 | 12/2006 | Kim et al. |
| 7,274,388 | B2 | 9/2007 | Zhang |
| 7,479,982 | B2 | 1/2009 | Otani et al. |
| 7,912,673 | B2 | 3/2011 | Hebert et al. |
| 8,082,120 | B2 | 12/2011 | St-Pierre et al. |
| 8,140,295 | B2 | 3/2012 | Hebert et al. |
| 8,208,029 | B2 | 6/2012 | Kim et al. |
| 8,436,904 | B2 | 5/2013 | Li et al. |
| 2006/0087737 | A1* | 4/2006 | Choi .................. G02B 27/0037 359/566 |
| 2010/0277627 | A1* | 11/2010 | Duparre ............ H01L 27/14603 348/262 |
| 2010/0283876 | A1* | 11/2010 | Chan ......................... G06T 1/00 348/252 |
| 2012/0127583 | A1* | 5/2012 | Peng ........................ G02B 9/12 359/682 |
| 2012/0268579 | A1 | 10/2012 | Zhao et al. |
| 2012/0307089 | A1* | 12/2012 | Rukes ................... H04N 5/232 348/208.99 |

FOREIGN PATENT DOCUMENTS

| | | |
|---|---|---|
| EP | 2249580 | 11/2010 |
| WO | 2013015699 | 1/2013 |

OTHER PUBLICATIONS

Wilson, "Modeling and Calibration of Automated Zoom Lenses", Videometrics, vol. 2350, SPIE, 1994, pp. 1-17.
Wilson et al., "What is the Center of the Image?", Carnegie Mellon University, Apr. 1993, CMU-CS-93-122.
Creaform, "Go! Scan 3D: The fastest and Easiest Handheld 3D Scanning Experience", Sep. 26, 2013. http://www.creaform3d.com/sites/default/files/assets/brochures/files/goscan3d_ind en_hq_26092013.pdf.
Devernay, "A Non-Maxima Suppression Method for Edge Detection with Sub-Pixel Accuracy", INRIA: Institut National de Recherche en Informatique et en Automatique, Report No. 2724, Nov. 1995, 20 pages.
Harry et al., "Correcting the Chromatic Aberration in Barrel Distortion of Endoscopic Images", Journal of Systemics, Cybernetics and Informatics, vol. 1, No. 2, 2003, pp. 81-87.
Derpanis, "The Harris Corner Detector", Oct. 2004, 2 pages.
Hartley et al., "Triangulation", Proceedings of the ARPA Image Understanding Workshop 1994, Monterey, CA 1994, pp. 957-966.
Becker, "Semiautomatic Camera Lens Calibration from Partially Known Structure", MIT: Massachusetts Institute of Technology, 1995. http://alumni.media.mit.edu/~sbeck/results/Distortion/distortion.html ©1994.
Becker, "Research Description", MIT: Massachusetts Institute of Technology, 1997. http://alumni.media.mit/edu/~sbeck/research.html.
Wang et al., "A New Calibration Model of Camera Lens Distorsion", Pattern Recognition, published by Elsevier, vol. 41, Feb. 2008, pp. 607-615.
Unnikrishnan et al., "Fast Extrinsic Calibration of a Laser Rangefinder to a Camera", Technical Report, Jul. 2005, Robotics Institute, Carnegie Mellon University, CMU-RI-TR-05-09.
Bouguet, "Camera Calibration Toolbox for Matlab". http://www.vision.caltech.edu/bouguetj/calib_doc/htmls/parameters.html.

* cited by examiner (a)  (b)

| R1  | G2  | R3  | G4  | R5  |
|-----|-----|-----|-----|-----|
| G6  | B7  | G8  | B9  | G10 |
| R11 | G12 | R13 | G14 | R15 |
| G16 | B17 | G18 | B19 | G20 |
| R21 | G22 | R23 | G24 | R25 |

Figure 18

SYSTEM AND METHOD FOR IMAGING DEVICE MODELLING AND CALIBRATION

CROSS-REFERENCE TO RELATED APPLICATIONS

This patent application claims priority of Canadian Application Serial No. 2,819,956, filed on Jul. 2, 2013.

TECHNICAL FIELD

The present invention relates to a system and method for imaging device modeling and calibration that compensates for imperfections in line of sight axis squareness with the image plane of the imaging device.

BACKGROUND

Calibration of digital cameras and other imaging devices seeks to create a mathematical model of how the image 'prints' through the lens on the imaging device's surface. The procedure first uses a picture from a calibration target with accurately known tolerance, and extracts target elements from the image. Finally, a mathematical model relates the image information with the real three-dimensional (3D) target information. Once calibrated, the imaging device can then be used to map real world objects using a scale factor, the focal distance f. When working from off-the-shelf cameras and lenses, we need to calibrate the camera to compensate for the tolerance on the lens focal distance, where the tolerance can be as high as 10%.

Moreover, once the model is accurately known, it can then be used to recreate a perfect camera image, also referred to as pinhole, needed for almost every high end automated imaging system. Through software image correction, we can compensate for image errors introduced by the imperfect nature of lenses, fish eye image deformation called geometric distortion, and rainbow light splitting in the lens optics called chromatic distortion. Several imaging devices will exhibit an off-squareness line of sight bias with respect to the image plane. In order to properly measure image distortion, the off-squareness of the image plane with respect to the lens line of sight needs to be compensated for. Known calibration techniques use the tilted axis assumption for this purpose. However, this assumption has proven to bias every camera parameter in the model, causing systematic measurement errors. As a result, a scale-size-distortion bias is introduced in the image that every other camera parameter seeks to compensate, biasing those camera parameters as well. In 3D scanning or telemetry, this translates into a geometry and location bias of 3D objects when reconstructing from a pair of simultaneous camera images.

There is therefore a need to improve on existing calibration and modeling techniques for imaging devices.

SUMMARY OF INVENTION

The proposed calibration and modeling technique introduces an accurate perspective correction to account for assembly tolerances in the imaging device or camera/lens system, causing the lens axis to be off-squareness with the image plane.

Accurate knowledge of camera plane and lens assembly removes a systematic bias in telemetry systems and 3D scanning using a digital camera or a camera stereo pair, yields an accurate focal length (image scale) measurement, locates the true image center position on the camera plane, and increases accuracy in measuring distortion introduced by image curvature (geometric distortion) and rainbow light splitting in the lens optics (chromatic distortion).

Accurate knowledge of camera plane and lens assembly increases the computational efficiency and accuracy in removing lens distortion, geometric and chromatic.

Removing lens distortion increases the image compression ratio without adding any loss.

According to a first broad aspect, there is described a computer-implemented method for modeling an imaging device for use in calibration and image correction, the method comprising defining a first 3D orthogonal coordinate system having an origin located at a focal point of the imaging device, a first axis of the first coordinate system extending along a direction of a line of sight of the imaging device; defining a second 3D orthogonal coordinate system having an origin located at a unitary distance from the focal point, a first axis of the second coordinate system extending along the direction of the line of sight, a second and a third axis of the second coordinate system substantially parallel to a second and a third axis of the first coordinate system respectively, the second and the third axis of the second coordinate system thereby defining a true scale plane square with the line of sight; defining a third 3D coordinate system having an origin located at a focal distance from the focal point, a first axis of the third coordinate system extending along the direction of the line of sight, a second and a third axis of the third coordinate system respectively tilted by a first and a second angle relative to an orientation of the second and the third axis of the second coordinate system, the second and the third axis of the third coordinate system thereby defining an image plane off-squareness relative to the line of sight; receiving a set of 3D coordinates associated with a point of a real world 3D object captured by the imaging device; computing a projection of the point onto the true scale plane, thereby obtaining a first set of planar coordinates, and onto the image plane, thereby obtaining a second set of planar coordinates; and outputting the second set of planar coordinates indicative of a location of an image point corresponding to the point of the 3D object.

In some embodiments, the second coordinate system is defined such that the true scale plane establishes an entry to a lens system of the imaging device and the projection on the true scale plane expresses an output of an external model of the imaging device and the third coordinate system is defined such that the image plane establishes an output to the lens system and the projection on the image plane expresses an output of an internal model of the imaging device.

In some embodiments, the received set of 3D coordinates is $[x\ y\ z\ 1]^T$ and the projection of the point of the 3D object onto the true scale plane is computed as:

$$P_1[x\ y\ z\ 1]^T = \begin{bmatrix} 1 & 0 & 0 & 0 \\ 0 & 1 & 0 & 0 \\ 0 & 0 & 1 & 0 \\ 0 & 0 & 1 & 0 \end{bmatrix}\begin{bmatrix} x \\ y \\ z \\ 1 \end{bmatrix} = \begin{bmatrix} x \\ y \\ z \\ z \end{bmatrix} \approx \begin{bmatrix} x/z \\ y/z \\ 1 \\ 1 \end{bmatrix},$$

where $\approx$ is a scale equivalent operator and $P_1$ defines a projection operation onto the true scale plane with respect to the first coordinate system.

In some embodiments, the projection of the point of the 3D object onto the image plane is computed as:

$$P_f R(y,\beta) R(x,\alpha)[x\ y\ z\ 1]^T = \begin{bmatrix} 1 & 0 & 0 & 0 \\ 0 & 1 & 0 & 0 \\ 0 & 0 & 1 & 0 \\ 0 & 0 & 1/f & 0 \end{bmatrix} \begin{bmatrix} \cos\beta & 0 & \sin\beta & 0 \\ 0 & 1 & 0 & 0 \\ -\sin\beta & 0 & \cos\beta & 0 \\ 0 & 0 & 0 & 1 \end{bmatrix}$$

$$\begin{bmatrix} 1 & 0 & 0 & 0 \\ 0 & \cos\alpha & -\sin\alpha & 0 \\ 0 & \sin\alpha & \cos\alpha & 0 \\ 0 & 0 & 0 & 1 \end{bmatrix}$$

$$\begin{bmatrix} x \\ y \\ z \\ 1 \end{bmatrix} = \begin{bmatrix} h_{11}x + h_{12}y + h_{13}z \\ h_{22}y + h_{23}z \\ h_{31}x + h_{32}y + h_{33}z \\ (1/f)(h_{31}x + h_{32}y + h_{33}z) \end{bmatrix} \approx \begin{bmatrix} \frac{f(h_{11}x + h_{12}y + h_{13}z)}{(h_{31}x + h_{32}y + h_{33}z)} \\ \frac{f(h_{22}y + h_{23}z)}{(h_{31}x + h_{32}y + h_{33}z)} \\ f \\ 1 \end{bmatrix} =$$

$$\begin{bmatrix} \frac{f(h_{11}x' + h_{12}y' + h_{13})}{(h_{31}x' + h_{32}y' + h_{33})} \\ \frac{f(h_{22}y' + h_{23})}{(h_{31}x' + h_{32}y' + h_{33})} \\ f \\ 1 \end{bmatrix} = [x''\ y''\ f\ 1]^T$$

where $P_f$ defines a projection operation onto the image plane, f is the focal distance, α is the first angle, β is the second angle, R(x, α) is an α rotation matrix with respect to an axis x of the image plane, the axis x defined as substantially parallel to the second axis of the first coordinate system before the α rotation is performed, R(y, β) is a β rotation matrix with respect to an axis y of the image plane, the axis y defined as substantially parallel to the third axis of the first coordinate system before the β rotation is performed, the α rotation computed rightmost such that the β rotation is performed relative to the axis x rotated by the angle α, and where $h_{11}=\cos\beta$,
$h_{12}=\sin\beta\sin\alpha$,
$h_{13}=\sin\beta\cos\alpha$,
$h_{22}=\cos\alpha$,
$h_{23}=-\sin\alpha$,
$h_{31}=\sin\beta$,
$h_{32}=\cos\beta\sin\alpha$, and
$h_{33}=\cos\beta\cos\alpha$.

In some embodiments, the method further comprises determining a homography H between the true scale plane and the image plane as:

$$H = \begin{bmatrix} fh_{11} & fh_{12} & fh_{13} \\ 0 & fh_{22} & fh_{23} \\ h_{31} & h_{32} & h_{33} \end{bmatrix},$$

where $h_{31}$ and $h_{32}$ are non-zero elements applying a perspective correction to x and y scales in the image plane and the second set of planar coordinates (x", y") is a homographic transformation of a distorted position (x', y') of an image of the point on the true scale plane, the homographic transformation expressed as:

$$[x''y''1]^T \approx [uvw]^T = H[x'y'1]^T,$$

where u=f(cos βx'+sin β sin αy'+sin β cos α),
v=f(cos αy'−sin α),
w=−sin βx'+cos β sin αy'+cos β cos α,
x"=u/w+$C_X$, and
y"=v/w+$C_Y$ with ($C_X$,$C_Y$) being a position of the origin of the third coordinate system.

In some embodiments, the homography H is determined as:

$$H = \begin{bmatrix} f\cos\beta & f\sin\beta\sin\alpha & f\sin\beta\cos\alpha \\ 0 & f\cos\alpha & f\sin\alpha \\ -\sin\beta & \cos\beta\sin\alpha & \cos\beta\cos\alpha \end{bmatrix} \sim \begin{bmatrix} f & f\alpha\beta & f\beta \\ 0 & f & f\alpha \\ -\beta & \alpha & 1 \end{bmatrix}$$

where the approximation cos θ~1 and sin θ~θ are used for small angles α and β.

In some embodiments, the method further comprises compensating for a distortion of a lens of the imaging device at the true scale plane, the compensating comprising applying a lens distortion model defined by:

$$r'=r+k_1 r^3+k_2 r^5+\ldots,$$

where the first set of planar coordinates comprises an undistorted position (x, y) of an image of the point on the true scale plane expressed in radial coordinates (r, θ), with $r^2=x^2+y^2$, tan θ=y/x, and at least one of x and y non-zero, (x', y') represents a distorted position of (x, y) at an output of the lens before projection of the point on the image plane, r' is a distorted radial distance computed on the basis of (x', y'), and $k_1$ and $k_2$ are geometric distortion parameters of the lens.

According to a second broad aspect, there is described a system for modeling an imaging device for use in calibration and image correction, the system comprising a memory; a processor; and at least one application stored in the memory and executable by the processor for defining a first 3D orthogonal coordinate system having an origin located at a focal point of the imaging device, a first axis of the first coordinate system extending along a direction of a line of sight of the imaging device; defining a second 3D orthogonal coordinate system having an origin located at a unitary distance from the focal point, a first axis of the second coordinate system extending along the direction of the line of sight, a second and a third axis of the second coordinate system substantially parallel to a second and a third axis of the first coordinate system respectively, the second and the third axis of the second coordinate system thereby defining a true scale plane square with the line of sight; defining a third 3D coordinate system having an origin located at a focal distance from the focal point, a first axis of the third coordinate system extending along the direction of the line of sight, a second and a third axis of the third coordinate system respectively tilted by a first and a second angle relative to an orientation of the second and the third axis of the second coordinate system, the second and the third axis of the third coordinate system thereby defining an image plane off-squareness relative to the line of sight; receiving a set of 3D coordinates associated with a point of a real world 3D object captured by the imaging device; computing a projection of the point onto the true scale plane, thereby obtaining a first set of planar coordinates, and onto the image plane, thereby obtaining a second set of planar coordinates; and outputting the second set of planar coordinates indicative of a location of an image point corresponding to the point of the 3D object.

In some embodiments, the at least one application is executable by the processor for defining the second coordinate system such that the true scale plane establishes an entry to a lens system of the imaging device and the projection on the true scale plane expresses an output of an external model of the imaging device and defining the third coordinate system such that the image plane establishes an output to the lens system and the projection on the image plane expresses an output of an internal model of the imaging device.

In some embodiments, the at least one application is executable by the processor for receiving the set of 3D coordinates as $[x\ y\ z\ 1]^T$ and computing the projection of the point of the 3D object onto the true scale plane as:

$$P_1[x\ y\ z\ 1]^T = \begin{bmatrix} 1 & 0 & 0 & 0 \\ 0 & 1 & 0 & 0 \\ 0 & 0 & 1 & 0 \\ 0 & 0 & 1 & 0 \end{bmatrix}\begin{bmatrix} x \\ y \\ z \\ 1 \end{bmatrix} = \begin{bmatrix} x \\ y \\ z \\ z \end{bmatrix} \approx \begin{bmatrix} x/z \\ y/z \\ 1 \\ 1 \end{bmatrix},$$

where $\approx$ is a scale equivalent operator and $P_1$ defines a projection operation onto the true scale plane with respect to the first coordinate system.

In some embodiments, the at least one application is executable by the processor for computing the projection of the point of the 3D object onto the image plane as:

$$P_f R(y,\beta)R(x,\alpha)[x\ y\ z\ 1]^T = \begin{bmatrix} 1 & 0 & 0 & 0 \\ 0 & 1 & 0 & 0 \\ 0 & 0 & 1 & 0 \\ 0 & 0 & 1/f & 0 \end{bmatrix}\begin{bmatrix} \cos\beta & 0 & \sin\beta & 0 \\ 0 & 1 & 0 & 0 \\ -\sin\beta & 0 & \cos\beta & 0 \\ 0 & 0 & 0 & 1 \end{bmatrix}$$

$$\begin{bmatrix} 1 & 0 & 0 & 0 \\ 0 & \cos\alpha & -\sin\alpha & 0 \\ 0 & \sin\alpha & \cos\alpha & 0 \\ 0 & 0 & 0 & 1 \end{bmatrix}$$

$$\begin{bmatrix} x \\ y \\ z \\ 1 \end{bmatrix} = \begin{bmatrix} h_{11}x + h_{12}y + h_{13}z \\ h_{22}y + h_{23}z \\ h_{31}x + h_{32}y + h_{33}z \\ (1/f)(h_{31}x + h_{32}y + h_{33}z) \end{bmatrix} \approx \begin{bmatrix} \frac{f(h_{11}x + h_{12}y + h_{13}z)}{(h_{31}x + h_{32}y + h_{33}z)} \\ \frac{f(h_{22}y + h_{23}z)}{(h_{31}x + h_{32}y + h_{33}z)} \\ f \\ 1 \end{bmatrix} =$$

$$\begin{bmatrix} \frac{f(h_{11}x' + h_{12}y' + h_{13})}{(h_{31}x' + h_{32}y' + h_{33})} \\ \frac{f(h_{22}y' + h_{23})}{(h_{31}x' + h_{32}y' + h_{33})} \\ f \\ 1 \end{bmatrix} = [x''\ y''\ f\ 1]^T$$

where $P_f$ defines a projection operation onto the image plane, f is the focal distance, $\alpha$ is the first angle, $\beta$ is the second angle, $R(x, \alpha)$ is an $\alpha$ rotation matrix with respect to an axis x of the image plane, the axis x defined as substantially parallel to the second axis of the first coordinate system before the $\alpha$ rotation is performed, $R(y, \beta)$ is a $\beta$ rotation matrix with respect to an axis y of the image plane, the axis y defined as substantially parallel to the third axis of the first coordinate system before the $\beta$ rotation is performed, the $\alpha$ rotation computed rightmost such that the $\beta$ rotation is performed relative to the axis x rotated by the angle $\alpha$, and where $h_{11} = \cos\beta$,
$h_{12} = \sin\beta\sin\alpha$,
$h_{13} = \sin\beta\cos\alpha$,
$h_{22} = \cos\alpha$,
$h_{23} = -\sin\alpha$,
$h_{31} = -\sin\beta$,
$h_{32} = \cos\beta\sin\alpha$, and
$h_{33} = \cos\beta\cos\alpha$.

In some embodiments, the at least one application is executable by the processor for determining a homography H between the true scale plane and the image plane as:

$$H = \begin{bmatrix} fh_{11} & fh_{12} & fh_{13} \\ 0 & fh_{22} & fh_{23} \\ h_{31} & h_{32} & h_{33} \end{bmatrix},$$

where $h_{31}$ and $h_{32}$ are non-zero elements applying a perspective correction to x and y scales in the image plane and the second set of planar coordinates (x'', y'') is a homographic transformation of a distorted position (x', y') of an image of the point on the true scale plane, the homographic transformation expressed as:

$[x''\ y''\ 1]^T \approx [u\ v\ w]^T = H[x'\ y'\ 1]^T$, where $u = f(\cos\beta x' + \sin\beta\sin\alpha y' + \sin\beta\cos\alpha)$, $v = f(\cos\alpha y' - \sin\alpha)$, $w = -\sin\beta x' + \cos\beta\sin\alpha y' + \cos\beta\cos\alpha$, $x'' = u/w + C_X$, and $y'' = v/w + C_Y$ with $(C_X, C_Y)$ being a position of the origin of the third coordinate system.

In some embodiments, the at least one application is executable by the processor for determining the homography H as:

$$H = \begin{bmatrix} f\cos\beta & f\sin\beta\sin\alpha & f\sin\beta\cos\alpha \\ 0 & f\cos\alpha & -f\sin\alpha \\ -\sin\beta & \cos\beta\sin\alpha & \cos\beta\cos\alpha \end{bmatrix} \approx \begin{bmatrix} f & f\alpha\beta & f\beta \\ 0 & f & -f\alpha \\ -\beta & \alpha & 1 \end{bmatrix}$$

where the approximation $\cos\theta \sim 1$ and $\sin\theta \sim \theta$ is used for small angles $\alpha$ and $\beta$.

In some embodiments, the at least one application is executable by the processor for compensating for a distortion of a lens of the imaging device at the true scale plane, the compensating comprising applying a lens distortion model defined by:

$r' = r + k_1 r^3 + k_2 r^5 + \ldots$, where the first set of planar coordinates comprises an undistorted position (x, y) of an image of the point on the true scale plane expressed in radial coordinates (r, $\theta$), with $r^2 = x^2 + y^2$, $\tan\theta = y/x$, and at least one of x and y non-zero, (x', y') represents a distorted position of (x, y) at an output of the lens before projection of the point on the image plane, r' is a distorted radial distance computed on the basis of (x', y'), and $k_1$ and $k_2$ are geometric distortion parameters of the lens.

In some embodiments, the imaging device comprises one of a zooming lens camera, a near-infrared imaging device, a short-wavelength infrared imaging device, a long-wavelength infrared imaging device, a radar device, a light detection and ranging device, a parabolic mirror telescope imager, a surgical endoscopic camera, a Computed tomography scanning device, a satellite imaging device, a sonar device, and a multi spectral sensor fusion system.

According to a third broad aspect, there is described a non-transitory computer readable medium having stored thereon program code executable by a processor for modeling an imaging device for use in calibration and image correction, the program code executable for defining a first 3D orthogonal coordinate system having an origin located at a focal point of the imaging device, a first axis of the first coordinate system extending along a direction of a line of sight of the imaging device; defining a second 3D orthogonal coordinate system having an origin located at a unitary distance from the focal point, a first axis of the second coordinate system extending along the direction of the line of sight, a second and a third axis of the second coordinate system substantially parallel to a second and a third axis of the first coordinate system respectively, the second and the third axis of the second coordinate system thereby defining a true scale plane square with the line of sight; defining a third 3D coordinate system having an origin located at a focal distance from the focal point, a first axis of the third coordinate system extending along the direction of the line of sight, a second and a third axis of the third coordinate system respectively tilted by a first and a second angle relative to an orientation of the second and the third axis of the second coordinate system, the second and the third axis of the third coordinate system thereby defining an image plane off-squareness relative to the line of sight; receiving a set of 3D coordinates associated with a point of a real world 3D object captured by the imaging device; computing a projection of the point onto the true scale plane, thereby obtaining a first set of planar coordinates, and onto the image plane, thereby obtaining a second set of planar coordinates; and outputting the second set of planar coordinates indicative of a location of an image point corresponding to the point of the 3D object.

BRIEF DESCRIPTION OF THE DRAWINGS

Further features and advantages of the present invention will become apparent from the following detailed description, taken in combination with the appended drawings, in which:

FIG. 9b is a block diagram showing an exemplary application running on the processor of FIG. 9a;

FIG. 18 is a schematic illustration of the Bayer Pattern layout for a colour camera.

It will be noted that throughout the appended drawings, like features are identified by like reference numerals.

BRIEF DESCRIPTION OF PREFERRED EMBODIMENTS 1.1 Lens Distortion

Figure 1:
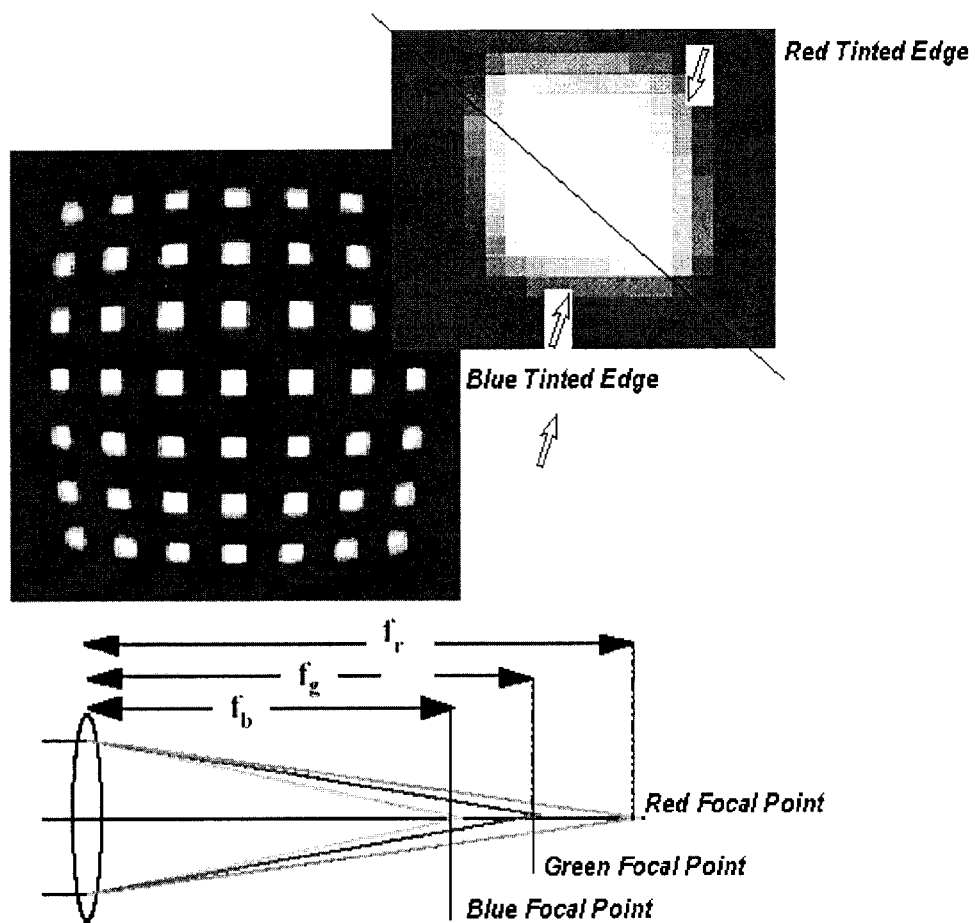
FIG. 1 is a schematic diagram illustrating lens distortion.
Figure 2:
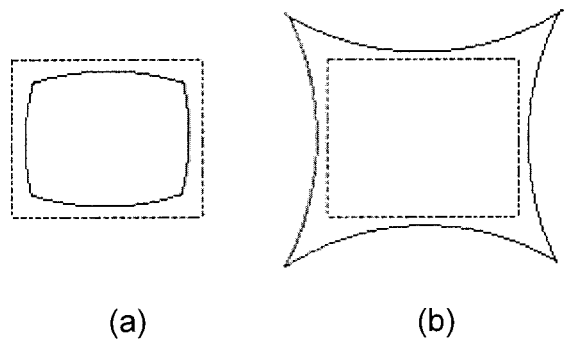
FIG. 2 are schematic views illustrating barrel and pincushion lens geometric distortion.

Lens distortion introduces the biggest error found in digital imaging. This is illustrated in FIGS. 1 and 2. As can be seen in FIG. 1, the fish eye effect is referred to as geometric distortion and curves straight lines. Coloured shading at the edges of the image (referred to as <<Blue Tinted Edge>> and <<Red Tinted Edge>> in FIG. 1) is referred to as chromatic distortion and is caused by the splitting of light in the lens of the imaging device (not shown). These deviations from pinhole behaviour increase with the lens angle of view. Both distortions have to be modeled and compensated for to achieve sub-pixel accuracy, compensation possible only through software to go beyond hardware capabilities. As can be seen in FIG. 2, when geometric distortion compresses the image on itself, it is referred to as barrel distortion (see FIG. 2 (a)); when the image expands, it is referred to as pincushion distortion (see FIG. 2 (b)).

1.2 Dithering

Figure 3:
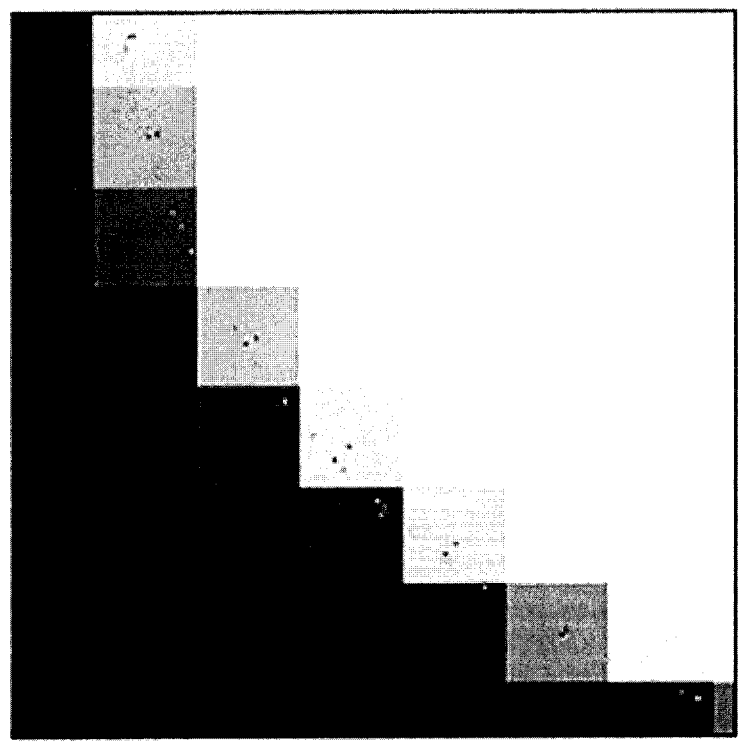
FIG. 3 is a plan view illustrating edge dithering when two neighbouring pixel colours mix.

With reference to FIG. 3, dithering is the intermediate pixel colour encountered when an edge goes through a given pixel and both neighbouring colours mix. The pixel colour is a weighed average of adjacent colour values, on either side of the edge, with respect to each colour's respective surface inside the pixel.

In low definition images, edge dithering (shading at object edges) interferes with lens distortion, geometric and chromatic. Using colour images from a black and white target, colour edge shading is caused by chromatic distortion. For a black and white target, dithering appears in grey shades as does geometric distortion. It is therefore desirable to isolate chromatic lens distortion from edge dithering or geometric distortion using edge colour.

1.3 Camera Model

Modeling a camera (or other imaging device) requires a mathematical model and a calibration procedure to measure the parameters that define the behaviour of a specific camera/lens combination.

Figure 4:
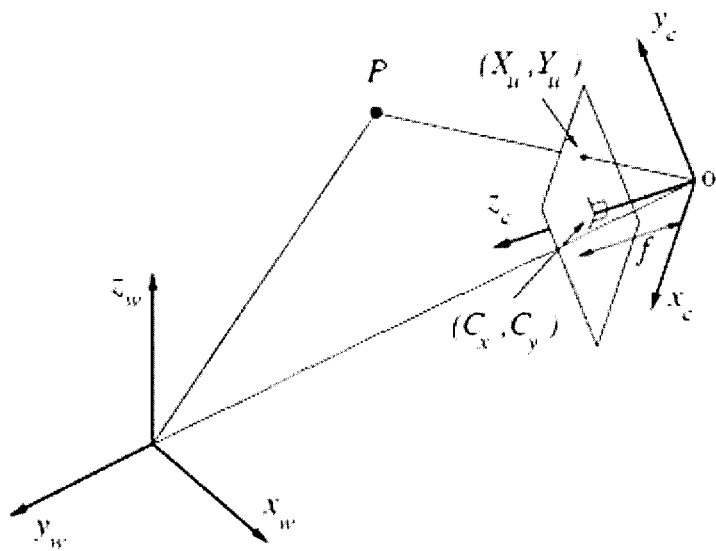
FIG. 4 is a schematic diagram illustrating the parameters that define the behaviour of a camera/lens combination in an ideal camera model representation assuming the image plane is square with the line of sight.

It should be understood that, although a camera is referred to herein, the proposed system and method also apply to other imaging devices. In particular, devices including, but not restricted to, zooming lens cameras; near-infrared (NIR), short-wavelength infrared (SWIR), and long-wavelength infrared (LWIR) infrared imaging devices; Radar and Light Detection And Ranging (LIDAR) devices; parabolic mirror telescope imagers; surgical endoscopic cameras; computed tomography (CT) scanning devices; satellite imaging devices; sonar devices; and multi spectral sensor fusion systems may also apply:

According to the published literature on the subject, the ideal camera model has three components, as shown in FIG. 4, namely:

1—External Model: Relationship between Camera Coordinates at Focal Point O (point in space where all light collapses to a single point), and World Coordinates in the world coordinate system ($X_W$ $Y_W$ $Z_W$);

2—Internal Model: Camera Plane Coordinate System ($X_C$ $Y_C$ $Z_C$), where $Z_C$ is the lens axis (i.e. the lens line of sight); and 3—Lens Model: Lens Geometric and Chromatic Distortion formulas.

Focal point O is the location in space where all images collapse to a single point; in front of the focal point O is the camera image plane (not shown). Lens axis $Z_C$ crosses the image plane at two (2) right angles (i.e. is square therewith), defining the image center location ($C_X$, $C_Y$).

1.3.1 Camera External Model

The camera external model shows accurate throughout the literature. Defining two coordinate sets, 1—World ($X_W$ $Y_W$ $Z_W$) with origin set at (0,0,0); and
2—Camera ($X_C$ $Y_C$ $Z_C$) at focal point O.

As can be seen in FIG. 4, which illustrates the ideal camera model, the camera coordinate set ($X_C$ $Y_C$ $Z_C$) starts with the lens axis $Z_C$ and the focal point O as the origin, $X_C$ is selected lining up with the horizontal axis (not shown) of the camera image plane. Geometrically, the $Y_C$ vertical axis should complete the set using the right hand rule. The external model writes as matrix [$R_{3\times3}$ $T_{3\times1}$] (discussed further below) and represents the World coordinate set ($X_W$ $Y_W$ $Z_W$) with origin set at (0, 0, 0).

The external camera model expresses rotations ($\kappa\phi\Omega$) and translations ($T_X$ $T_Y$ $T_Z$) needed to align the camera coordinate set ($X_C$ $Y_C$ $Z_C$) with the world set of coordinates ($X_W$ $Y_W$ $Z_W$), and bring the focal point O at the world origin (0,0,0). The external camera model therefore has six (6) degrees of freedom, namely the ($\kappa\phi\Omega$) rotation angles and translations ($T_X$ $T_Y$ $T_Z$).

1.3.2 Camera Internal Model

Figure 5:
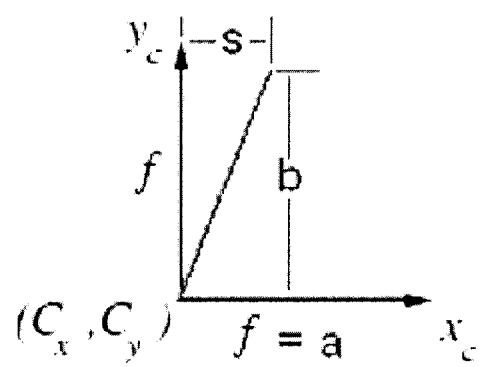
FIG. 5 is a schematic diagram of the tilted axis assumption of a camera internal model where tilted axis compensation is added to the ideal camera representation of FIG. 4.

Referring now to FIG. 5 in addition to FIG. 4, a prior art camera internal model where compensation for off-squareness is performed will now be described. If the image plane were perfectly square with the lens axis $Z_C$, the scale factor between world measurements $X_W$ $Y_W$ and camera measurements $X_C$ $Y_C$ would be f in both x and y directions. To account for the loss of squareness between the lens axis $Z_C$ and the image plane, which results from manufacturing errors, the research community introduces the tilted axis assumption shown in FIG. 5. In the tilted axis assumption, tilting of the image plane axis is assumed so that the image plane can be considered square with the lens axis.

Various formulations exist, essentially:

Parameter a is the horizontal image scale, perfectly aligned with the camera pixel grid array horizontal axis;

The vertical scale is set to b, different from a;

The scale and orientation of the vertical axis of the image plane is tilted by skew parameter s relative to the axis $Y_C$, where s is a scale measure of skew relative to the image scale.

With the image center ($C_X$, $C_Y$) being the point where the lens axis $Z_C$ intersects the image plane, together with the coordinates ($C_X$, $C_Y$), a, b, and s would be, according to already published work using the tilted axis assumption, the five (5) internal camera parameters. The internal camera model therefore has five (5) degrees of freedom.

The image plane pixel grid array having a very accurate manufacturing process, calibration should retrieve a horizontal image scale equal to the vertical image scale, i.e. a=b=f, with no skew of the vertical axis, i.e. s=0. The widespread tilted axis assumption however introduces a perspective bias, shifting all the other camera parameters, and should be replaced by a full 3D perspective model of the image plane that retains the camera image plane geometry. It is therefore proposed to introduce a new set of variables for the internal camera model, as shown in FIG. 6 in which a model is represented in camera coordinates (starting from the focal point O).

In the proposed model, the image center ($C_X$, $C_Y$) remains the intersection between the lens axis $Z_C$ and the camera (i.e. image) plane. Two scale independent simultaneous perspectives of an outside 3D world object (a point P thereof being located somewhere in the world at given coordinates relative to the axes ($X_C$ $Y_C$ $Z_C$)) are considered.

Figure 6:
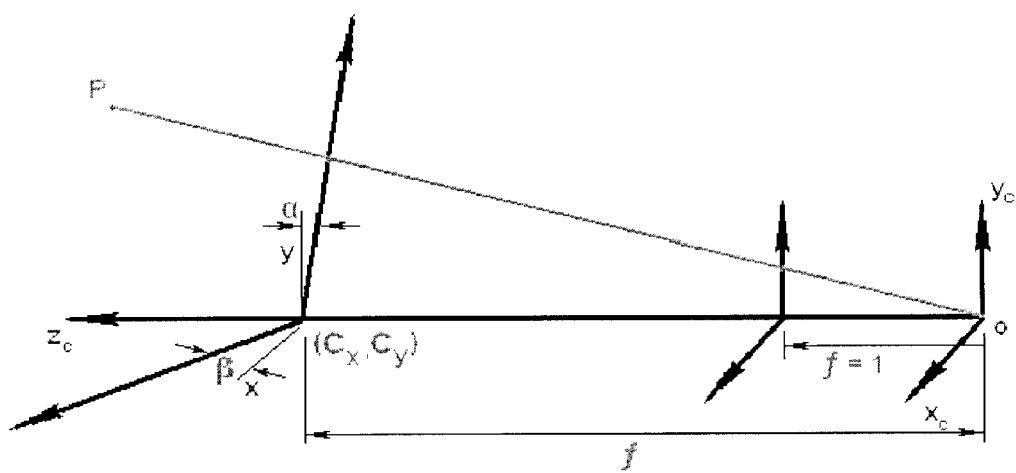
FIG. 6 is a schematic diagram of a new set of variables for a camera internal model, in accordance with an illustrative embodiment of the present invention.

Illustratively, the entry of the lens system is defined as a theoretical plane at f=1 along the line of sight axis $Z_C$, the theoretical plane being represented in FIG. 6 by two axes, with unit focal distance at f=1, and perfectly square (i.e. at right angles) with the lens axis $Z_C$. This first plane represents the perfect 1:1 true scale projection of the 3D object on a plane having infinite dimensions in x and y.

The projection on f=1 is therefore expressed by the matrix transformation [$R_{3\times3}$ $T_{3\times1}$]:

$$[R_{3\times3} T_{3\times1}] = \begin{bmatrix} r_{11} & r_{12} & r_{13} & T_X \\ r_{21} & r_{22} & r_{23} & T_Y \\ r_{31} & r_{32} & r_{33} & T_Z \end{bmatrix} \quad (1)$$

Using homogeneous coordinates, point P=[X Y Z 1]$^T$ in 3D world coordinates (X Y Z is given with respect to world coordinates ($X_W$ $Y_W$ $Z_W$), X' Y' Z' with respect to camera coordinates system ($X_C$ $Y_C$ $Z_C$)) projects as:

$$[R_{3\times3} T_{3\times1}][XYZ1]^T = [X'Y'Z']^T \approx [X'/Z' \; Y'/Z' \; 1]^T \quad (2)$$

where the third component Z' of the resulting three-component vector is rescaled to unity, such that [X'Y'Z']$^T$ is scale equivalent to [X'/Z' Y'/Z' 1]$^T$. The 3D point P=(X, Y, Z) is projected in two dimensions as (X'/Z', Y'/Z'). The symbol $\approx$ in equation (2) represents the scale equivalent operator in homogeneous coordinates.

The elements $r_{ij}$, i,j=1,2,3 in equation (1) are functions of model parameters, namely the three (3) rotation angles (κφΩ) discussed above, and $(T_X T_Y T_Z)$, which is the position of the world origin with respect to focal point O.

In addition to the true scale perspective of the outside 3D world object, the second perspective is the image plane itself, i.e. the output of the lens system. The image plane is represented in FIG. 6 by two axes intersecting at $(C_X, C_Y)$. Since the camera plane at the focal distance f is off-squareness with the lens axis $Z_C$, it needs five (5) parameters. Using on the image plane at f the same horizontal and vertical axis orientations as defined at the focal point O coordinate set (i.e. coordinate set $(X_C Y_C Z_C)$), two rotation angles α and β with respect to both x and y axes are used to account for the tilting of the camera plane. In particular and as shown in FIG. 6, the x axis of the image plane is rotated by angle α while the y axis of the image plane is rotated by angle β, such that the image plane is tilted by angles α and β with respect to axes x and y, with the x and y axes of the image plane taken parallel to $X_C$ and $Y_C$ at origin O initially, i.e. before any rotation. In other words, the axes x and y are illustratively taken parallel to $X_C$ and $Y_C$ at origin O and reproduced on the image plane before any rotation is applied to tilt the image plane. As a result, tilting of the image plane can be expressed by two (2) 3D rotations in space, namely a rotation about axis $Y_C$ by angle α and a second rotation about axis $X_C$ by angle β. The x axis of the image plane being arbitrarily selected as aligned with the horizontal camera plane direction, there is therefore no need for a z axis rotation angle. It should be understood that in some embodiments, for instance embodiments where two imaging devices sharing the same line of sight are used concurrently to capture images of the world object or embodiments where a three-CCD camera (with three separate charge-coupled devices (CCDs)) is used, a z axis rotation angle may be desirable. In addition to the rotation angles α and β, the three remaining degrees of freedom for the camera internal model are then the focal distance f (or camera image scale) and coordinates of the image center $(C_X, C_Y)$.

The internal K matrix corresponding to the widespread tilted axis assumption in FIG. 5 is given by equation (3) below.

$$K = \begin{bmatrix} a & s & C_X \\ 0 & b & C_Y \\ 0 & 0 & 1 \end{bmatrix} \quad (3)$$

The top left 2×2 matrix partition in equation (3) represents the image plane x and y axes with skew parameter s, horizontal scale a, and vertical scale b. Taken as column vectors, the image plane x axis is aligned with the horizontal direction of the camera plane pixel array grid (not shown), accounting for the 0 value in position (2,1) of the K matrix. The image plane y axis is tilted by s in the x direction as illustrated in FIG. 5. The last column represents the image center location $(C_X, C_Y)$.

The error in the tilted axis assumption of FIG. 5 is visible in the lower left 1×2 matrix partition. The two (2) terms of the lower left 1×2 partition should not be zero when the lens axis is off-squareness with the camera plane. When they are non-zero, these terms apply a perspective correction to x and y scales in the image plane as one moves away from the image center.

To compute the projected x and y axis as they should be taking perspective into account, it is therefore proposed to start with a camera image plane perfectly square with the lens axis $Z_c$. The projected camera x and y axis are then computed as tilted respectively by angles α and β, as discussed above, thereby obtaining an image plane that is off-squareness with the lens axis $Z_C$. In the proposed method, the internal camera model is defined as a perspective transformation with five (5) degrees of freedom that relates the outside camera model projection in true 1:1 scale to the image plane projection at focal distance f on a common line of sight $Z_C$, and where the image plane is tilted by angles α and β with respect to axes x and y on the image plane, the x and y axes taken parallel to $X_C$ and $Y_C$ at origin O before any rotation. FIG. 6 shows $(C_X, C_Y)$ at the line of sight $Z_C$. In FIG. 6, $Z_C$ is taken as the origin for all planes intersecting with the line of sight. We initially assume $(C_X, C_Y)=(0, 0)$, and, after projection, a shift of origin is applied to offset the image plane centre from (0, 0) to $(C_X, C_Y)$.

In homogeneous coordinates, any 3D point in space $[x\ y\ z\ 1]^T$ is projected on the 1:1 f=1 true scale plane as:

$$P_1 [x\ y\ z\ 1]^T = \begin{bmatrix} 1 & 0 & 0 & 0 \\ 0 & 1 & 0 & 0 \\ 0 & 0 & 1 & 0 \\ 0 & 0 & 1 & 0 \end{bmatrix} \begin{bmatrix} x \\ y \\ z \\ 1 \end{bmatrix} = \begin{bmatrix} x \\ y \\ z \\ z \end{bmatrix} \approx \begin{bmatrix} x/z \\ y/z \\ 1 \\ 1 \end{bmatrix} \quad (4)$$

The last operation in equation (4) is the rescaling fourth ($4^{th}$) coordinate to unity. The third coordinate shows that point (x/z, y/z) lies on a plane at z=1.

For an image plane tilted by α and β with respect to axes x and y respectively and with focal distance f, the same point is also projected on the tilted image plane as:

$$P_f R(y, \beta) R(x, \alpha) [x\ y\ z\ 1]^T = \begin{bmatrix} 1 & 0 & 0 & 0 \\ 0 & 1 & 0 & 0 \\ 0 & 0 & 1 & 0 \\ 0 & 0 & 1/f & 0 \end{bmatrix} \quad (5)$$

$$\begin{bmatrix} \cos\beta & 0 & \sin\beta & 0 \\ 0 & 1 & 0 & 0 \\ -\sin\beta & 0 & \cos\beta & 0 \\ 0 & 0 & 0 & 1 \end{bmatrix} \begin{bmatrix} 1 & 0 & 0 & 0 \\ 0 & \cos\alpha & -\sin\alpha & 0 \\ 0 & \sin\alpha & \cos\alpha & 0 \\ 0 & 0 & 0 & 1 \end{bmatrix} \begin{bmatrix} x \\ y \\ z \\ 1 \end{bmatrix}$$

where $P_f$ defines the projection operation where element (4,3) is 1/f, f is the focal distance, $R(y, \beta)$ is a β rotation matrix with respect to the y axis, and $R(x, \alpha)$ is an α rotation matrix with respect to the x axis.

The α rotation in equation (5) is computed rightmost, so the β rotation is performed relative to an image plane y axis rotated by angle α. It should be understood that the β rotation could be handled rightmost in equation (5), meaning that the α rotation would be performed relative to a β rotated x axis. Homogeneous equations read from right to left and reversing the order of multiplication yields different mathematical formulations. Several models are possible.

Multiplying the matrices of equation (5), we obtain:

$$P_f R(y, \beta) R(x, \alpha) [x\ y\ z\ 1]^T = \quad (6)$$

$$\begin{bmatrix} 1 & 0 & 0 & 0 \\ 0 & 1 & 0 & 0 \\ 0 & 0 & 1 & 0 \\ 0 & 0 & 1/f & 0 \end{bmatrix} \begin{bmatrix} \cos\beta & \sin\beta\sin\alpha & \sin\beta\cos\alpha & 0 \\ 0 & \cos\alpha & -\sin\alpha & 0 \\ -\sin\beta & \cos\beta\sin\alpha & \cos\beta\cos\alpha & 0 \\ 0 & 0 & 0 & 1 \end{bmatrix} \begin{bmatrix} x \\ y \\ z \\ 1 \end{bmatrix}$$

-continued $$P_f R(y, \beta) \quad (7)$$

$$R(x, \alpha)[x\ y\ z\ 1]^T = \begin{bmatrix} 1 & 0 & 0 & 0 \\ 0 & 1 & 0 & 0 \\ 0 & 0 & 1 & 0 \\ 0 & 0 & 1/f & 0 \end{bmatrix} \begin{bmatrix} h_{11} & h_{12} & h_{13} & 0 \\ 0 & h_{22} & h_{23} & 0 \\ h_{31} & h_{31} & h_{33} & 0 \\ 0 & 0 & 0 & 1 \end{bmatrix} \begin{bmatrix} x \\ y \\ z \\ 1 \end{bmatrix}$$

$$P_f R(y, \beta) R(x, \alpha) [x\ y\ z\ 1]^T = \begin{bmatrix} h_{11}x + h_{12}y + h_{13}z \\ h_{22}y + h_{23}z \\ h_{31}x + h_{32}y + h_{33}z \\ (1/f)(h_{31}x + h_{32}y + h_{33}z) \end{bmatrix} \quad (8)$$

$$\approx \begin{bmatrix} f(h_{11}x + h_{12}y + h_{13}z)/(h_{31}x + h_{32}y + h_{33}z) \\ f(h_{22}y + h_{23}z)/(h_{31}x + h_{32}y + h_{33}z) \\ f \\ 1 \end{bmatrix}$$

The last operation (equation (8)) is again the rescaling of the fourth ($4^{th}$) coordinate to unity.

$P_1 [x\ y\ z\ 1]^T$ and $P_1 R(y, \beta) R(x, \alpha) [x\ y\ z\ 1]^T$ are two projections of the same 3D point $[x\ y\ z\ 1]^T$, and are related by a simple homographic transformation. Substituting for x'=x/z and y'=y/z and noting that (x', y') is the projection $P_1 [x\ y\ z\ 1]^T$ where we discarded the z component (1, plane located at z=1) and unit scale factor, $P_1 R(y, \beta) R(x, \alpha) [x\ y\ z\ 1]^T$ can be written as:

$$P_f R(y, \beta) R(x, \alpha) [x\ y\ z\ 1]^T = \begin{bmatrix} f(h_{11}x' + h_{12}y' + h_{13})/(h_{31}x' + h_{32}y' + h_{33}) \\ f(h_{22}y' + h_{23})/(h_{31}x' + h_{32}y' + h_{33}) \\ f \\ 1 \end{bmatrix} \quad (9)$$

$$= [x''\ y''\ f\ 1]^T$$

where
$h_{11}=\cos \beta$
$h_{12}=\sin \beta \sin \alpha$
$h_{13}=\sin \beta \cos \alpha$
$h_{22}=\cos \alpha$
$h_{23}=-\sin \alpha$
$h_{31}=-\sin \beta$
$h_{32}=\cos \beta \sin \alpha$
$h_{33}=\cos \beta \cos \alpha$ Defining the homography H between both planes (at f=1 and f) as:

$$H = \begin{bmatrix} fh_{11} & fh_{12} & fh_{13} \\ 0 & fh_{22} & fh_{23} \\ h_{31} & h_{32} & h_{33} \end{bmatrix} \quad (10)$$

The tilted image plane coordinate (x", y") is a homographic transformation of the (x', y') 1:1 true scale plane projection, expressed in 2D homogeneous coordinates:

$[x''y''1]^T \approx [uvw]^T = H[x'y'1]^T$, where $x''=u/w$ and $y''=v/w$ (11)

where the symbol ≈ represents the scale equivalent operator in homogeneous coordinates. As expected, element (2,1) in H (equation (10)) is 0, meaning that the x axis is parallel to the camera plane horizontal grid. The perspective elements $h_{31}$ and $h_{32}$ in row 3 (see equation (10)) create the plane perspective scale change moving away from the image center. These elements vanish to zero when the camera plane is square with the lens axis, i.e. when α=β=0.

For a non zero ($C_X$, $C_Y$), since the internal camera model has to be handled in homogeneous coordinates, a perspective rescaling is needed before adding the image center ($C_X$, $C_Y$). In a two-step process, assuming no lens distortion, between external model point (x', y') in 1:1 true scale and image plane coordinates (x",y"), we obtain:

Step 1: $[u\ v\ w]^T = H[x'y'1]^T$ $u=f(\cos \beta x'+\sin \beta \sin \alpha y'+\sin \beta \cos \alpha)$ $v=f(\cos \alpha y'-\sin \alpha)$ $w=-\sin \beta x'+\cos \beta \sin \alpha y'+\cos \beta \cos \alpha$ (12)

Step 2: rescaling to unity w=1 and translating by ($C_X$, $C_Y$) giving image point (x",y")

$x''=(u/w+C_X)$ $y''=(v/w+C_Y)$ (13)

In the absence of lens distortion, calibration is therefore finding the best match between two (2) projections. Every point in space maps to two (2) independent projection planes, i.e. the true scale plane and the tilted image plane. As discussed above, the f=1 (i.e. true scale) plane is illustratively perfectly square with the lens axis and has six (6) degrees of freedom: (κϕΩ) and ($T_X$ $T_Y$ $T_Z$), giving our proposed external model (i.e. the relationship between camera and world coordinates). At f, the camera (i.e. image) plane is scale invariant with the true scale plane: The image at f cannot be a pure scale multiplication of the f=1 true scale image. At f, the image plane has five (5) degrees of freedom: plane tilting angles α and β, image center ($C_X$, $C_Y$) and focal distance f, giving the internal model.

A point in the f=1 true size plane then corresponds to a point in the tilted image plane and all corresponding projection points pairs at f=1 and f define lines converging at the focal point O (in the absence of lens distortion). Still, lens distortion occurs between the two planes and has to be accounted for in the model. Thus, knowing the exact 3D object geometry of the calibration target, calibration is finding a 3D correspondence between pairs of coordinates projected in the two planes, compensating for lens distortion.

Alternate formulations for the internal camera model are possible using the same basic principle discussed above, for instance rotations with respect to axes x and y on image plane, taken parallel to $X_C$ and $Y_C$ at origin O before any rotation. can be geometrically applied in reverse order. As discussed above, when two image planes share the same line of sight, a z axis rotation can be added to one of them in order to express the relative misalignment between both images x horizontal axis.

1.3.3 Lens Distortion Model

Once the camera plane tilting angles α and β are properly accounted for, the camera image can be computed on a plane perfectly square with lens axis $Z_c$, e.g. a plane at f=1 or a plane at f corrected for squareness with the lens axis $Z_c$ being the line of sight for all planes under consideration, as discussed above. Although the proposed technique discussed herein models the imaging device (e.g. camera) using projections on a plane at f=1 and a plane at f, it should be understood that more than two projection planes may be used to model lens distortion. Indeed, planes at f=1 and at f are illustratively the minimal requirements as f=1 is the projection in the external model and f locates the image plane. In some embodiments, one or more intermediary planes may be modeled between the planes at f=1 and the plane at f. For instance, a third intermediary plane may be positioned at the minimum focal distance $f_{min}$ of the imaging device, with a first homography being computed between the planes at f=1 and $f_{min}$ and a second homography being computed between the planes at $f_{min}$ and f.

For a projection plane at right angle with $Z_c$, the lens distortion model can be reduced to a purely radial function, both geometric and chromatic.

Many lens geometric distortion models were published. Some authors claim 1/20 pixel accuracy in removing geometric lens distortion. Overall, their basic criterion is more or less the same: lines that are straight in real life should appear straight in the image once geometric distortion is removed. Very few authors consider chromatic distortion in their lens model. The most widespread lens geometric distortion model is the Shawn Becker model, as follows [3]:

$$x'=x+x(k_1r^2+k_2r^4+k_3r^6)+p_1*(r^2+2x^2)+2p_2xy \quad (14)$$

$$y'=y+y(k_1r^2+k_2r^4+k_3r^6)+p_2*(r^2+2y^2)+2p_1xy, r^2=x^2+y^2 \quad (15)$$

where (x', y') represents the new location of point (x, y), computed with respect to image center ($C_X$, $C_Y$), $k_1$, $k_2$, and $k_3$ are three terms of radial distortion, and $p_1$ and $p_2$ are two terms of decentering distortion. Calibration retrieves numerical values for parameters $k_1$, $k_2$, $k_3$, $p_1$, and $p_2$. Image analysis gives (x' y'). The undistorted (x y) position is found solving the two equations using a 2D search algorithm.

Most lens distortion models were able to straighten curved lines. Modeling errors appeared when recovering 3D positions from a calibrated stereo pair. Straight lines looking straight is an insufficient criterion to guarantee accurate geometric distortion correction. Wrong perspective will cause a measurement error across the image, and the titled axis assumption in FIG. 5 creates a systematic perspective bias.

Figure 7:
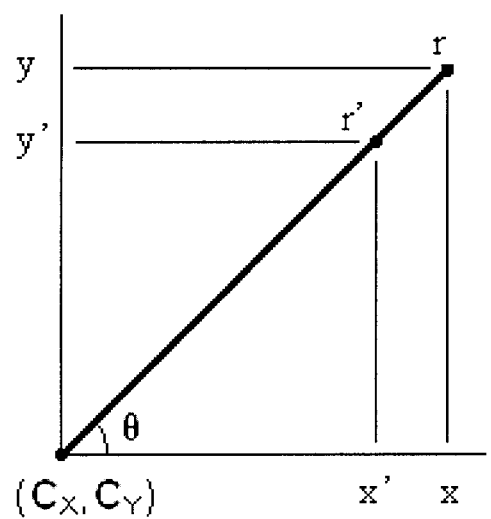
FIG. 7 is a schematic diagram of a radial distortion mode, in accordance with an illustrative embodiment of the present invention.

The proposed modification of the camera model increased calibration accuracy and reduced the lens geometric distortion model complexity. Only parameters $k_1$ and $k_2$ of the Shawn Becker's lens geometric distortion model were retained, and Shawn Becker's two equations (14), (15) reduce to only one:

$$r'=r+k_1r^3+k_2r^5+\ldots \text{ (can be expanded), find } r$$
$$\text{knowing } r' \text{ from a fully radial displacement model,} \quad (16)$$

which could be expanded using odd terms in r, where $r^2=x^2+y^2$. As can be seen in FIG. 7, a fully radial displacement model can be used where geometric distortion can be modelled as a fully radial displacement. External model image point (x, y) (which is illustratively representative of a measurable quantity, e.g. in inches or millimeters, rather than pixels) can be expressed in radial coordinates (r, θ) where $r^2=x^2+y^2$ and tan θ=y/x, x and y taken with respect to image center and at least one of x and y non-zero.

Even from a look-up table (LUT), using equation (16) reduces computation by 4:1, uses significantly less memory, making the proposed camera model better suited for real time computation. Even with this simplified model, from a 640×480 Bayer Pattern 1/3 CCD colour camera with a f=4 mm micro lens (angle of view about 90°), the focal distance f was retrieved to an accuracy of $10^{-10}$ mm.

Once the true image center is known, chromatic distortion can be modeled from a single image center. Several formulations are possible for chromatic distortion:

1—Single center from geometric calibration on green channel, using deviation of blue and red;

2—Calibration of red green and blue channels independently;

3—Average red green and blue for geometric calibration, deviation of red and blue for chromatic;

1.3.4 Entire Camera Model

Figure 8A:
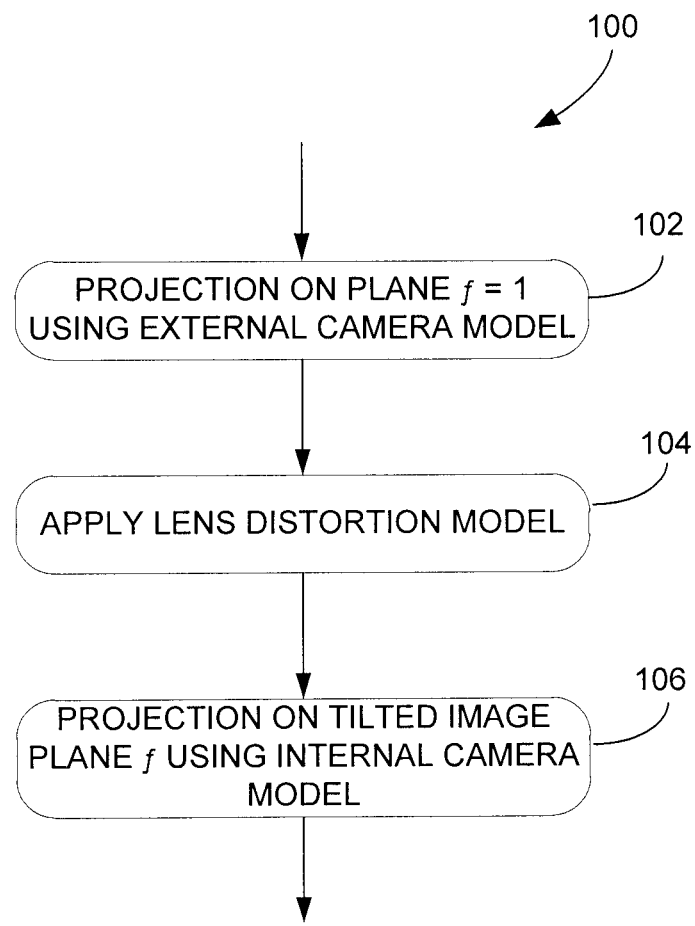
FIG. 8a is a flowchart of a method for computing the location of an image point, in accordance with an illustrative embodiment of the present invention.

Referring now to FIG. 8a, there is illustrated a method 100 for computing, using the proposed camera model, the location of an image point, as per the above. A 3D point in space goes through three transformations to give an image point located on the image plane. The method 100 illustratively comprises projection on plane f=1 using the proposed external camera model at step 102, applying the lens distortion model at step 104, and projecting on the tilted image plane at f using the internal camera model at step 106. After step 106 is performed, the location (x", y") of the camera image point corresponding to a 3D point (X, Y, Z) captured by the camera is obtained.

Figure 8B:
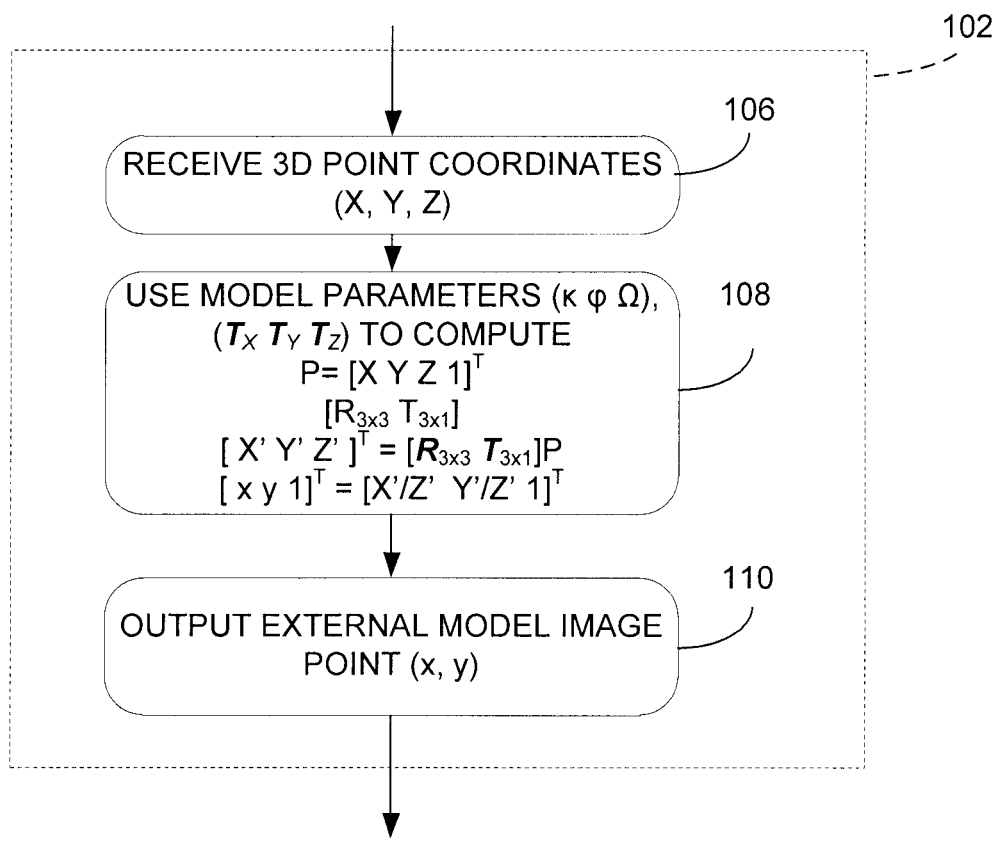
FIG. 8b is a flowchart of the step of FIG. 8a of projecting on plane f=1 using an external camera model.

Referring now to FIG. 8b, the step 102 illustratively computes the proposed external camera model transformation and comprises receiving at step 106 the coordinates (X, Y, Z) of a 3D point P expressed with respect to world coordinate system ($X_W Y_W Z_W$).

As discussed above, given the posture of the 3D object point P belongs to, the angles and position from which the camera sees the object, the f=1 projection gives a unique 1:1 true scale image of the object from its six (6) degrees of freedom: three (3) angles (κφΩ), and position ($T_X T_Y T_Z$) defining relative orientation and position between world and camera coordinate reference systems ($X_W Y_W Z_W$) and ($X_C Y_C Z_C$). Using the model parameters (κφΩ), ($T_X T_Y T_Z$), the following is computed at step 108 in homogeneous coordinates, as discussed above:

$$P = [X \ Y \ Z \ 1]^T$$

$$[R_{3\times 3} T_{3\times 1}] = \begin{bmatrix} r_{11} & r_{12} & r_{13} & T_X \\ r_{21} & r_{22} & r_{23} & T_Y \\ r_{31} & r_{32} & r_{33} & T_Z \end{bmatrix},$$

$r_{ij}$, i,j=1, ..., 3 are functions of target posture angles (κφΩ), $$[X'Y'Z'1]^T = [R_{3\times 3}T_{3\times 1}][XYZ1]^T$$

Scaling to unity Z' gives the external model image point (x, y), where:

$$[xy1]^T = [X'/Z' Y'/Z' 1]^T \approx [X'Y'Z']^T.$$

The external model image point is then output at step 110.

Figure 8C:
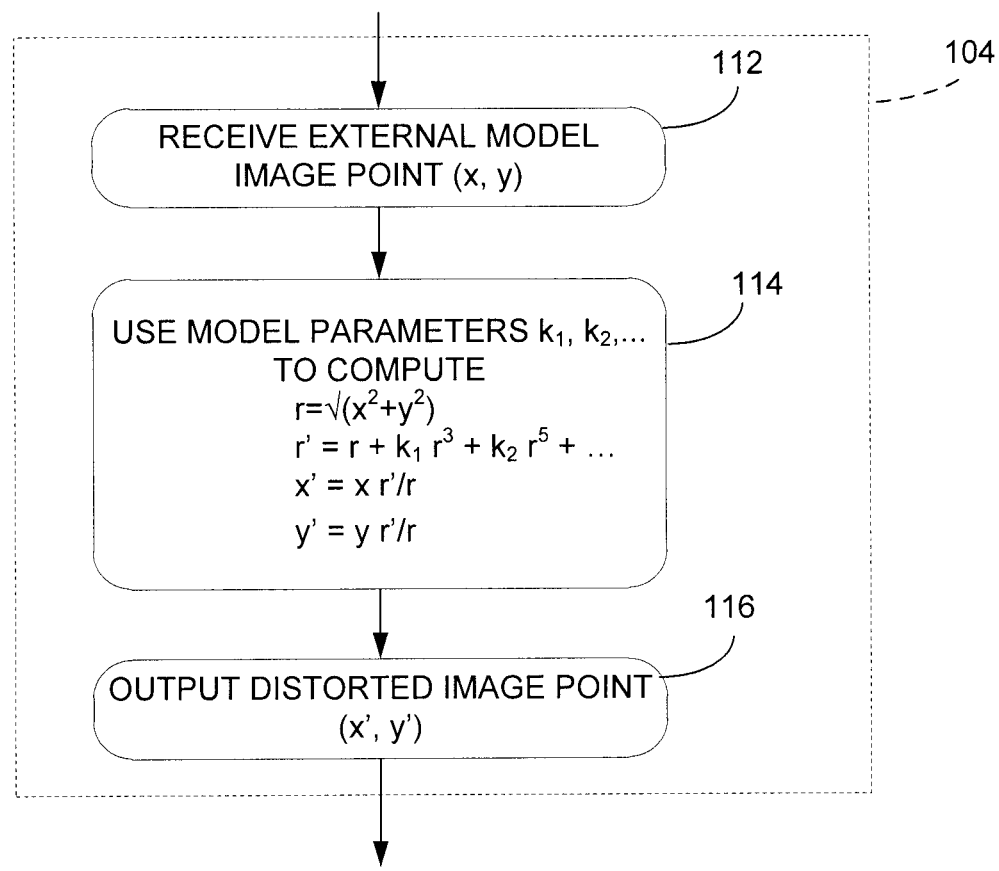
FIG. 8c is a flowchart of the step of FIG. 8a of applying a lens distortion model.

Referring now to FIG. 8c, applying the lens distortion model at step 104 illustratively comprises receiving the external model image point (x, y) at step 112. Using model parameters, i.e. the lens geometric distortion parameters $k_1$ and $k_2$ step 114 illustratively comprises computing r, r', and the distorted image point (x', y'). It should be understood that, in some embodiment, e.g. depending on the fisheye of the imaging device's lens, parameters $k_1$ and $k_2$ may be expanded. Indeed, as discussed above, in its simplest form, geometric distortion can be modeled as a fully radial displacement. External model image point (x, y) can be expressed in radial coordinates (r, θ) where r2=x2+y2 and tan θ=y/x, x and y taken with respect to image center (0, 0) and at least one of x and y non-zero. The new distorted distance r' knowing r is given by:

$$r'=r+k_1r^3+k_2r^5+\ldots \text{ (can be expanded)},$$

where $k_1$ and $k_2$ are the lens geometric distortion parameters. Distorted image point (x' y') can be computed knowing θ or using similar triangle properties:

$$(x', y')=(r' \cos \theta, r' \sin \theta),$$

or $(x', y')=(x\ r''/r, y\ r''/r)$

The distorted image point (x', y') is then output at step 116.

In one embodiment, lens distortion is modeled in 1:1 f=1 scale with (0, 0) image center. Still, as will be discussed further below, it should be understood that f can be factored from the internal camera model and lens distortion handled in the f scale.

Figure 8D:
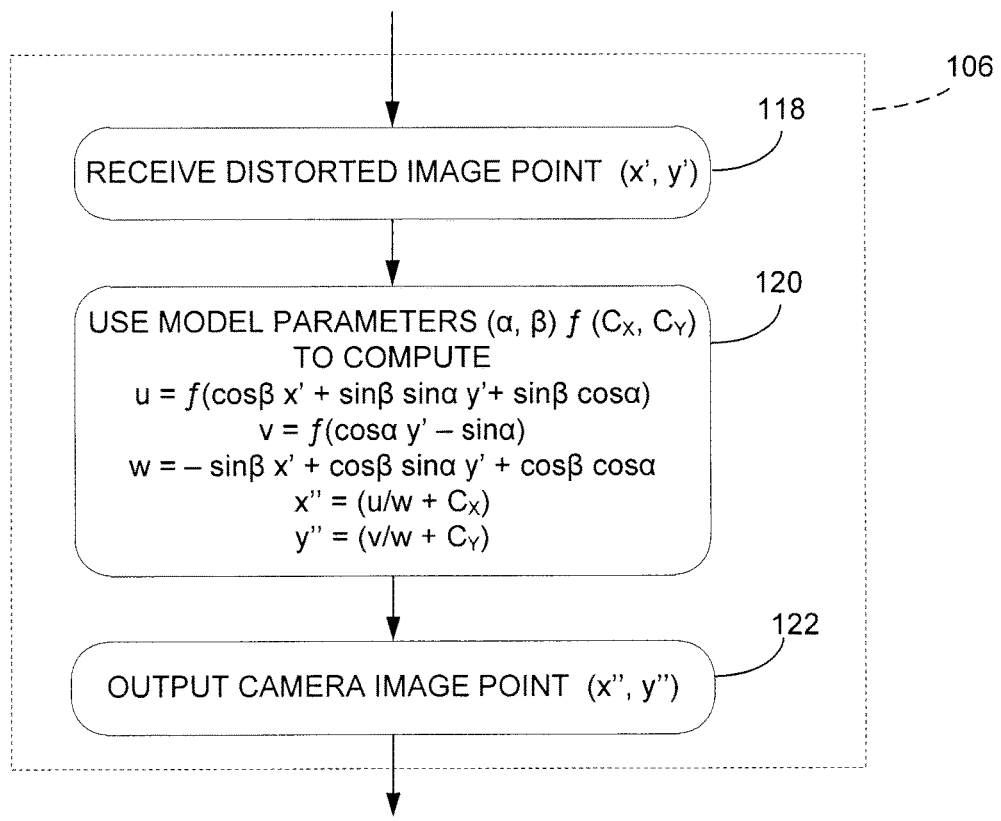
FIG. 8d is a flowchart of the step of FIG. 8a of projecting on a tilted image plane f using an internal camera model.

Referring now to FIG. 8d, obtaining 106 the internal camera model illustratively comprises receiving the distorted image point (x', y') at step 118. From the distorted image point (x', y') and from the internal camera model five degrees of freedom, namely α and β (image plane tilt angles), the focal distance f, and the image center coordinates ($C_X$, $C_Y$), the following is computed at step 120:

$$u=f(\cos \beta x' + \sin \beta \sin \alpha y' + \sin \beta \cos \alpha)$$

$$v=f(\cos \alpha y' - \sin \alpha)$$

$$w=-\sin \beta x' + \cos \beta \sin \alpha y' + \cos \beta \cos \alpha$$

$$x''=(u/w+C_X)$$

$$y''=(v/w+C_Y)$$

where (x", y") is the image point on the camera internal image plane, which may be output at step 122.

As discussed above, f can be factored from the internal camera model. In order to create an approximation of the internal camera model, we can use for small angles α and β, the approximation $\cos \theta \sim \approx 1$ and $\sin \theta \sim \approx \theta$. It should be understood that other series approximations of sin and cos are possible. As can be seen from equation (12) below, substituting, $h_{33}$ becomes unity, $h_{13}=f\beta$ and $h_{23}=-f\alpha$ create a correction of the image center, $h_{11}$ and $h_{22}$ become f and give an identical scale in x and y, $h_{12}=f\alpha\beta$ creates the equivalent of skew in the image. $h_{31}=-\beta$ as well as $h_{32}=\alpha$ cannot become zero as indicated previously. They give the image a perspective correction moving away in x and y from the image center when rescaling by $w'=1+y\alpha-x\beta$, with x and y measured with respect to the image center.

$$H = \begin{bmatrix} f\cos\beta & f\sin\beta\sin\alpha & f\sin\beta\cos\alpha \\ 0 & f\cos\alpha & -f\sin\alpha \\ -\sin\beta & \cos\beta\sin\alpha & \cos\beta\cos\alpha \end{bmatrix} \sim \begin{bmatrix} f & f\alpha\beta & f\beta \\ 0 & f & -f\alpha \\ -\beta & \alpha & 1 \end{bmatrix} \quad (17)$$

As also discussed above, lens distortion can be modeled with respect to the image plane scale f. To model lens distortion according to the image plane scale, an imaginary intermediate plane of projection has to be added to the model, located at f along $Z_C$, with (0, 0) center, and perfectly square with lens axis $Z_C$.

$$\begin{bmatrix} 1 & 0 & 0 & 0 \\ 0 & 1 & 0 & 0 \\ 0 & 0 & 1 & 0 \\ 0 & 0 & 1/f & 0 \end{bmatrix} \begin{bmatrix} X' \\ Y' \\ Z' \\ 1 \end{bmatrix} = \begin{bmatrix} X' \\ Y' \\ Z' \\ Z'/f \end{bmatrix} \Rightarrow \begin{bmatrix} fx \\ fy \\ f \\ 1 \end{bmatrix} \quad (18)$$

The transformation is represented with a pure scaling homography Sf $$Sf = \begin{bmatrix} f & 0 & 0 \\ 0 & f & 0 \\ 0 & 0 & 1 \end{bmatrix} \quad (19)$$

We can factor Sf from H in the internal camera model. We can apply Sf scaling at the end of the external model to compute (fx, fy), use (fx, fy) in the lens distortion model, and therefore set f=1 in the internal camera model. Lens distortion parameters will then be computed as in f scale, as if the image plane was corrected and tilted back at right angle with the line of sight $Z_C$ with (0, 0) image center position.

The requirement for lens distortion modeling is to compute radial distance r for a plane perfectly square with the line of sight, with respect to the image center. It provides added freedom in modeling fixed lenses, but f=1 1:1 true scale modeling of lens distortion is an advantage for zooming lens applications making lens distortion parameters independent from f.

Figure 9A:
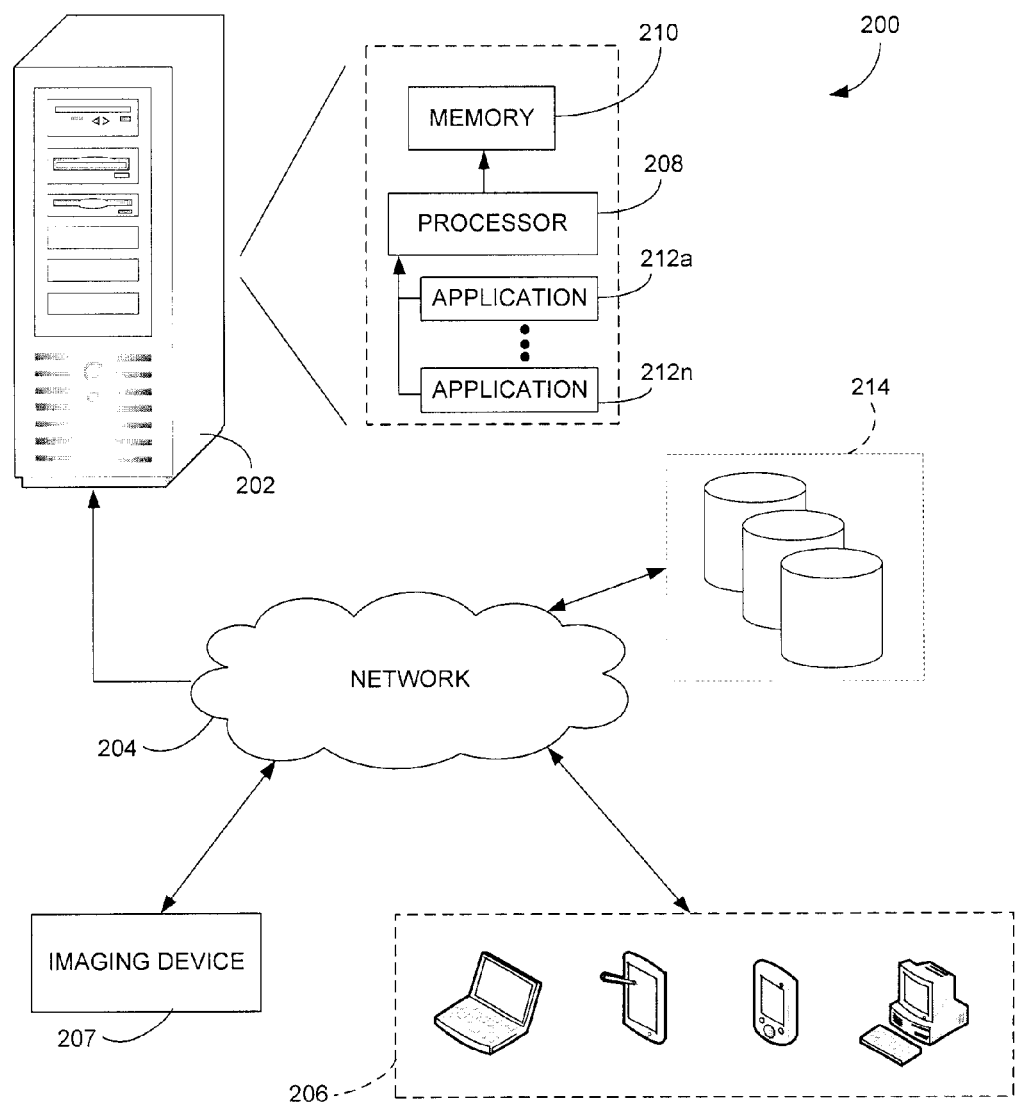
FIG. 9a is a schematic diagram of a system for computing the location of an image point, in accordance with an illustrative embodiment of the present invention.

Referring now to FIG. 9a, there is illustrated a system 200 for modeling and calibrating an imaging device. The system 200 comprises one or more server(s) 202 accessible via the network 204. For example, a series of servers corresponding to a web server, an application server, and a database server may be used. These servers are all represented by server 202. The server 202 may be accessed by a user using one of a plurality of devices 206 adapted to communicate over the network 204. The devices 206 may comprise any device, such as a personal computer, a tablet computer, a personal digital assistant, a smart phone, or the like, which is configured to communicate over the network 204, such as the Internet, the Public Switch Telephone Network (PSTN), a cellular network, or others known to those skilled in the art. Although illustrated as being separate and remote from the devices 206, it should be understood that the server 202 may also be integrated with the devices 206, either as a downloaded software application, a firmware application, or a combination thereof. It should also be understood that several devices as in 206 may access the server 202 at once.

Imaging data may be acquired by an imaging device 207 used for calibration and image correction. The device 207 may be separate from (as illustrated) the devices 206 or integral therewith. The imaging data may comprise one or more images of a real world 3D object (not shown), such as a calibration target as will be discussed further below. The imaging data may then be processed at the server 202 to obtain a model of the imaging device 207 in the manner described above with reference to FIG. 8a, FIG. 8b, FIG. 8c, and FIG. 8d. The imaging data is illustratively acquired in real-time (e.g. at a rate of 30 images per second) for an object, such as a moving object whose movement in space is being monitored. The server 202 may then process the imaging data to determine an image point associated with each point of each acquired image. Alternatively, the imaging data may be processed to determine an image point associated with each one of one or more points of interest in the image.

The server 202 may comprise, amongst other things, a processor 208 coupled to a memory 210 and having a plurality of applications 212a ... 212n running thereon. It should be understood that while the applications 212a ...

212n presented herein are illustrated and described as separate entities, they may be combined or separated in a variety of ways.

One or more databases 214 may be integrated directly into the memory 210 or may be provided separately therefrom and remotely from the server 202 (as illustrated). In the case of a remote access to the databases 214, access may occur via any type of network 204, as indicated above. The various databases 214 described herein may be provided as collections of data or information organized for rapid search and retrieval by a computer. The databases 214 may be structured to facilitate storage, retrieval, modification, and deletion of data in conjunction with various data-processing operations. The databases 214 may consist of a file or sets of files that can be broken down into records, each of which consists of one or more fields. Database information may be retrieved through queries using keywords and sorting commands, in order to rapidly search, rearrange, group, and select the field. The databases 214 may be any organization of data on a data storage medium, such as one or more servers.

In one embodiment, the databases 214 are secure web servers and Hypertext Transport Protocol Secure (HTTPS) capable of supporting Transport Layer Security (TLS), which is a protocol used for access to the data. Communications to and from the secure web servers may be secured using Secure Sockets Layer (SSL). Identity verification of a user may be performed using usernames and passwords for all users. Various levels of access rights may be provided to multiple levels of users.

Alternatively, any known communication protocols that enable devices within a computer network to exchange information may be used. Examples of protocols are as follows: IP (Internet Protocol), UDP (User Datagram Protocol), TCP (Transmission Control Protocol), DHCP (Dynamic Host Configuration Protocol), HTTP (Hypertext Transfer Protocol), FTP (File Transfer Protocol), Telnet (Telnet Remote Protocol), SSH (Secure Shell Remote Protocol).

The memory 210 accessible by the processor 208 may receive and store data. The memory 210 may be a main memory, such as a high speed Random Access Memory (RAM), or an auxiliary storage unit, such as a hard disk, flash memory, or a magnetic tape drive. The memory 210 may be any other type of memory, such as a Read-Only Memory (ROM), Erasable Programmable Read-Only Memory (EPROM), or optical storage media such as a videodisc and a compact disc.

The processor 208 may access the memory 210 to retrieve data. The processor 208 may be any device that can perform operations on data. Examples are a central processing unit (CPU), a front-end processor, a microprocessor, and a network processor. The applications 212a . . . 212n are coupled to the processor 208 and configured to perform various tasks as explained below in more detail. An output may be transmitted to the devices 206.

Figure 9B:
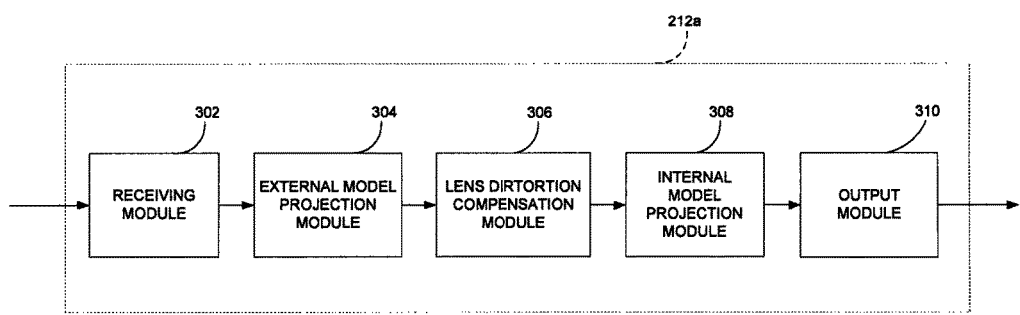

FIG. 9b is an exemplary embodiment of an application 212a running on the processor 208. The application 212a may comprise a receiving module 302 for receiving the imaging data from the imaging device 207 and obtaining therefrom coordinates of a point of a real 3D world object as captured by the imaging device 207, an external model projection module 304 enabling the method illustrated and described in reference to FIG. 8b, a lens distortion compensation module 306 enabling the method illustrated and described in reference to FIG. 8c, an internal model projection module 308 enabling the method illustrated and described in reference to FIG. 8d, and an output module 310 for outputting coordinates of a camera image point, as computed by the internal model defining module 308.

2.0 Calibration

Figure 10:
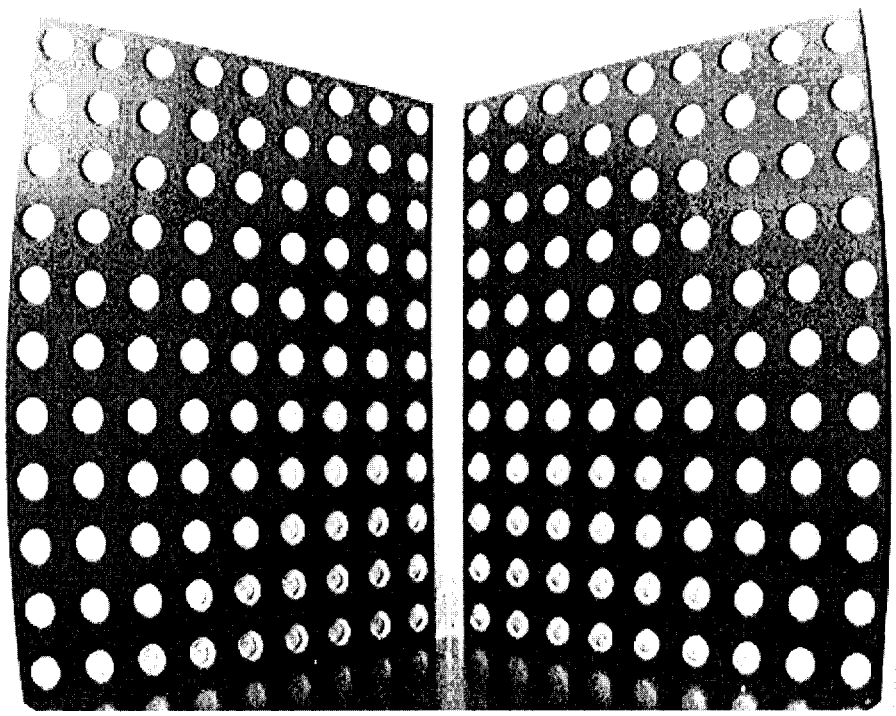
FIG. 10 is a distorted photograph view of a calibration target.
Figure 11:
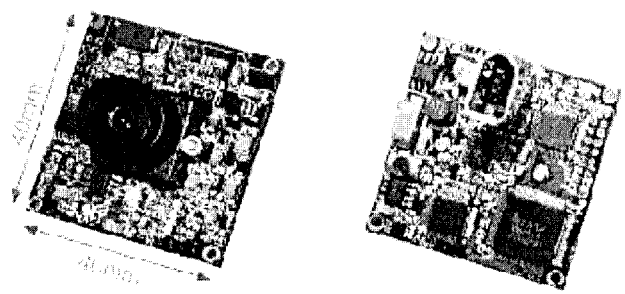
FIG. 11 are photographic views of a micro lens test camera with circuit board.
Figure 12:
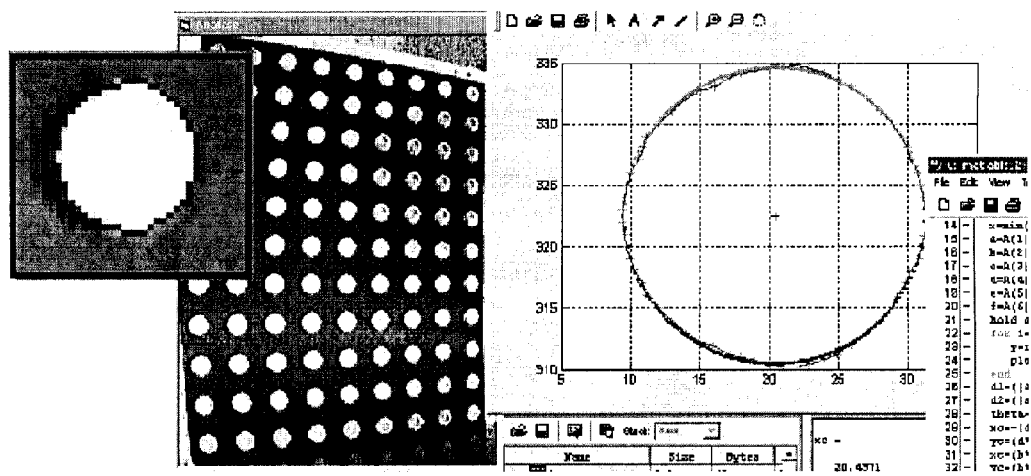
FIG. 12 is a combined illustration of target extraction.

Referring now to FIG. 10, FIG. 11, and FIG. 12, calibration models the 3D to 2D image creation process. From two (2) calibrated cameras, the 2D to 3D stereo pair inverse operation is used to validate model accuracy.

2.1 Experimental Setup

The experimental proposed setup is intended to be field usable, even with low resolution short-wavelength infrared (SWIR) imagers. On two (2) 90° planes of black anodized aluminium (not shown), two circle grids (not shown) are formed (e.g. engraved), changing the surface emissive properties in the SWIR spectrum, and providing black and white information for colour calibration, as illustrated in FIG. 10.

Some published approaches use the center portion in the image to avoid distortion and isolate some camera parameters. Unfortunately, it also creates a parameter estimation bias. In the proposed approach, any ellipse center taken anywhere in the image should fit the model. Therefore, the proposed model is accurate across the entire image, even for a wide angle lens.

Once the ellipse centers are measured from the image, we have a data set that relates 3D real world target positions with their 2D respective location in the image. Using a camera model to correlate them, a Levenberg-Marquardt search algorithm may be used to compute the model parameters. It should be understood that algorithms other than the Levenberg-Marquardt algorithm may apply. For instance, the steepest descent or Newton algorithms may be used. The accuracy improvements achieved with the proposed technique allowed to use a least square sum of error criteria without bias. The error is defined as the image predicted target position from the model and 3D data set, minus the corresponding real image measurement in 2D.

Calibration target uses 1″ diameter circles at 2″ center to center spacing. Using circles ensures that no corner should be detected even with a highly pixelized image, see FIG. 12.

Each circle gives a local estimate of the camera behaviour, without bias or any preferred edge orientation. We are more concerned with accurate ellipse center location accuracy than signal-to-noise (S/N) ratio on edge detection. Significant work was needed to test various techniques for ellipse modeling and avoid a center bias estimation. Since the image is highly pixelized, the edge detector footprint is illustratively restricted to a 3×3 pixel area.

Since it is intended to use the proposed technique on low resolution cameras, a 640×480 Bayer Pattern Point Grey Research Firefly™ colour camera is illustratively chosen, with its supplied f=4 mm micro lens for testing, as shown in FIG. 11.

It was eventually concluded that moment techniques are unable to deal with glare and reflection, therefore unusable for field calibration. We found ¼ to ½ pixel center bias in several cases. Those errors being so small, extensive mathematical analysis was required to remove them from the shape recovery process; they are invisible to the human eye.

Edge gradient sensing techniques, on the other hand, exhibited a sub pixel location bias when the edge orientation did not line up with the horizontal or vertical camera grid pixel array. In the end, a sub pixel correction on the 'Non Maxima Suppression' sub pixel extension by Devernay [1] was used. In a two step process, step 1 recovered an initial estimate for the edge points, adding compensation for edge orientation bias. On that initial set, a first estimate of the ellipse geometry is computed. In step 2, the initial ellipse fit is used to estimate local curvature and correct the edge location.

2.2 Calibration Result

Using the same experimental data, the parameter estimation is compared for two (2) camera models, as shown in the table 1 below.

3.0 Model/Calibration Bias Impact

The major model bias impact shows on 3D telemetry from a stereo pair, as used in a 3D scanner application. The same conclusion holds true for a 3D extraction from a moving camera since basically the mathematical triangulation process is the same.

TABLE 1

| omega(z): | 3.13369E+00 | rad | 179.5472 | ° | 3.13212E+00 | rad | 179.4574 | ° |
|---|---|---|---|---|---|---|---|---|
| phi(y): | −8.14667E−01 | rad | −46.6770 | ° | −8.14619E−01 | rad | −46.6742 | ° |
| kappa(x): | 8.43958E−03 | rad | 0.4836 | ° | 8.71144E−03 | rad | 0.4991 | ° |
| Tx: | −4.73799E+01 | mm | 1.8654 | in | −4.76618E+01 | mm | −1.8764 | in |
| Ty: | 2.38080E−02 | mm | 9.3732 | in | 2.40577E+02 | mm | 9.4715 | in |
| Tz: | 9.81422E+02 | mm | 38.6387 | in | 9.785135E+02 | mm | 38.5241 | in |
| Cx: | 2.22866E−01 | mm | 359.7976 | pixel | 2.24170E−01 | mm | 360.0303 | pixel |
| Cy: | 1.70224E−01 | mm | 270.3972 | pixel | 1.59918E−01 | mm | 268.5568 | pixel |
| a: | 3.92269E+00 | mm | 3.9227 | mm | 3.91093E+00 | mm | 3.910931 | mm |
| b: | 3.92154E+00 | mm | 3.9215 | mm | 3.91093E+00 | mm | 3.910931 | mm |
| s: | 8.80439E−04 | mm | 0.0009 | mm | 8.00000E−11 | mm | 0.000000 | mm |
| k1: | −4.15502E−01 | | −0.415502 | | −4.16424E−01 | | −0.416424 | |
| k2: | 1.78838E−01 | | 0.178838 | | 1.80131E−01 | | 0.180131 | |

The leftmost camera parameter set is obtained from the most accurate model published, tested on our own experimental data. The rightmost set was computed from the proposed model, where the lens model was taken as a purely radial geometric distortion, and where the internal camera model used the proposed implementation.

The first six (6) lines of the above table are the external camera parameters, three (3) angles and three (3) positions needed to compute $[R_{3\times3}\ T_{3\times1}]$. The next five (5) lines are the internal camera parameters; we modified our parameter representation to fit the generally used model from FIG. 5. Our degrees of freedom use a different mathematical formulation. Then, the remaining two (2) lines show the major lens geometric distortion parameters $k_1$ and $k_2$. These two are present in most models and account for most of fish eye geometric distortion.

From a, b and s, as discussed herein above, we consider a=b=f with s=0 as expressing camera pixel squareness, and the error on focal distance f. If a pixel is square, height scale should be equal to width scale, both should be perfectly at right angle, and a=b=f should represent the image scale.

Switching to the proposed model, the error on f reduces from $10^{-3}$ mm to $10^{-10}$ mm. Initially, focal distance f was wrong by 0.03%. Although it seems small, the model bias shifted the image center ($C_X$, $C_Y$) by close to two (2) pixels mostly in the Y direction. At the same time, all external parameters have shifted. All the angles are changed, and object distance $T_Z$ is wrong by 0.3%: An error on range measurement amplified ten (10) times with respect to the error on f. It's a systematic range measurement error: A 3 mm error at 1 m distance would scale to 30 m at 10 km distance. Error percentages on $T_X$ and $T_Y$ are even worse, indicating that the leftmost model seeks to preserve distances along lens axis $Z_C$. From a calibrated stereo pair, 3D recovery shows an error equivalent to two (2) pixels at the image scale. Stereo 3D measurement will be further discussed further below.

Considering distortion parameters $k_1$ and $k_2$, (the minus sign on $k_1$ means barrel distortion), it is noticed that both are under estimated. There is some residual curvature as one goes away from the image center. It may be smaller than a pixel, but curvature would build up if one tried to stitch images to create a map from multiple pictures.

3.1 Recovering 3D from a Stereo Pair

Figure 13:
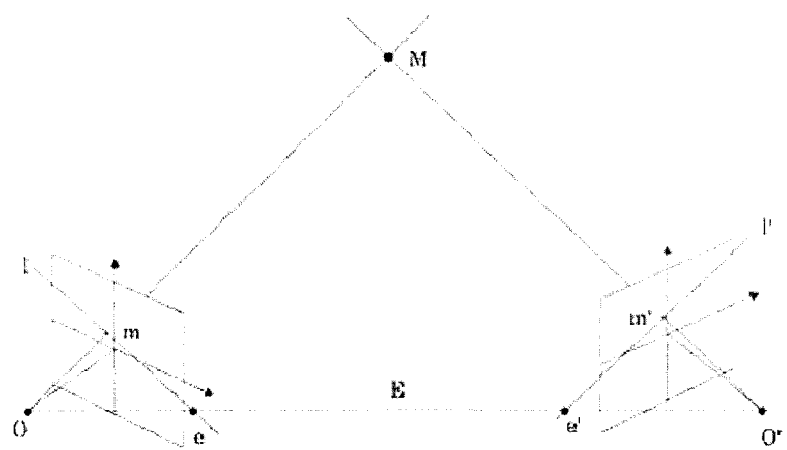
FIG. 13 is a schematic diagram of a stereo pair used for measuring objects in 3D using two camera images simultaneously.

As mentioned previously, neglecting the proposed correction on the camera model creates a 3D triangulation systematic error. FIG. 13 shows a stereo pair typically used for measuring objects in 3D, using two (2) simultaneous camera images. A full discussion on triangulation is given in [5].

O and O' are the optical centers for the two cameras (not shown), and both lens axes project at right angles on the image planes at the image centers, respectively ($C_X$, $C_Y$, f) and ($C_X'$, $C_Y'$, f') (not shown for clarity), where ($C_X$, $C_Y$) is the origin of the image plane, and f the distance between O and the image plane, as shown in FIG. 4. Similarly, ($C_X'$, $C_Y'$) is the origin of the image plane, and f' the distance between O' and the image plane.

Both cameras are seeing a common point M on the object (not shown). M projects in both camera images as points m and m'.

To find out where M is in space, two lines are stretched starting from O and O' through their respective camera image points m and m'. M is computed where both lines intersect.

3D accuracy depends on the accurate knowledge of:
1. Optical centers O and O'
2. Focal distances f and f'
3. Image centers ($C_X$, $C_Y$) and ($C_X'$, $C_Y'$)
4. Lens axis orientation $X_C$ and $Z_C'$
5. Accuracy on image points m and m'
6. Intersection for OM and O'M The first four (4) requirements for 3D telemetric accuracy are found trough camera calibration, the fifth from sub pixel image feature extraction. The last is the triangulation 3D recovery itself.

The first four (4) error dependencies described above, namely the optical centers O and O', the focal distances f and f', the Image centers ($C_X$, $C_Y$) and ($C_X'$, $C_Y'$), and the lens axis orientation $Z_C$ and $Z_C'$, are subject to the discovered camera model bias discussed above.

Although the tilted axis assumption creates a very small error on focal distance f, it will generate a large bias on image center ($C_X$, $C_Y$) and focal points O and O'. Since O and O' are out of position, the triangulation to find M gives a systematic 3D error. From the proposed calibration example, the two (2) pixel error on the optical centers O and O' dominate any measurement error on image points m and m' since we were able to retrieve them to ¼ pixel accuracy.

Feature point extraction (m and m') is subject to the edge orientation bias, and corner detection bias that had to be delt with at calibration.

And finally, triangulation, a classical Singular Value Decomposition (SVD) approach was resorted to for its stability and speed. Nothing ever guarantees that two lines will intersect in space. Therefore, M is sought as the point in space where both lines are closest.

Over the course of our investigation, several bias sources were measured as affecting accuracy, with the camera model bias being the major contributor. The bias sources include the following:

| | |
|---|---|
| Camera/lens model | (2 pixel error on image center ($C_X$, $C_Y$)) |
| Sub pixel edge orientation bias | (¼ pixel edge shift) |
| Sub pixel corner detection bias | (¼ pixel corner offset) |
| Unaccounted chromatic distortion | (½ pixel edge shift with respect to colour) |
| Under compensated geometric distortion | (½ pixel residual curvature easily undetected) |
| JPEG image filtering at sub pixel level | (variable with JPEG quality parameter) |

Aside the camera model's bias, most bias sources will result in feature point extraction errors. Removing these bias sources leads to a cumulated benefit. Achieving f accurate to $10^{-10}$ mm even from a low resolution Bayer pattern camera using a wide angle micro lens by simply changing the camera internal model shows a major improvement, and explains why an accurate zooming lens model was impossible until now.

3.2 Model Bias: Overall and the Zooming Lens

As discussed above, every lens parameter is 'polluted' by the internal camera model bias referred to as the tilted axis assumption. The bias can be removed by changing the tilted assumption for an accurate perspective model of the 3D internal camera image plane.

In 3D triangulation, either from stereo or from a moving camera, the impact is that since image scale and image center are wrong, triangulation is shifted.

The example illustrated in table 1 also shows that lens distortion parameters are under evaluated, with the minus sign on $k_1$ meaning barrel distortion. When stitching multiple images to create a map, it results as curvature buildup from image to image.

Range and aim measurements are also biased and related to the error percentage on focal distance f since a camera gives a scaled measure.

It also prevents the accurate modeling of the zooming lens camera. In a zooming lens, focal point O moves along the lens axis $Z_C$. From calibration, O is found by knowing image center ($C_X$, $C_Y$), f away at right angle with the image plane. The proposed example shows a systematic bias in those parameters. It gets even worse when considering run out in the lens mechanism since it moves the lens axis $Z_C$.

Without the proposed modification to the camera model, it then becomes impossible to model a zooming lens.

Modeling of the zooming lens camera requires plotting the displacement of focal point O in space. An ideal zooming lens would have O moving in a straight line on lens axis $Z_C$, with entry plane f=1 moving along. As soon as mechanical assembly errors occur, the linear displacement relationship for point O breaks up. The only way to evaluate the mechanical quality of the zooming lens therefore depends on the accurate knowledge of image center ($C_X$, $C_Y$) and f.

Mechanical quality behaviour is also the zooming lens tradeoff: zooming in to gain added accuracy when needed, at the cost of losing accuracy for assembly tolerances in the lens mechanism.

3.3 Geometric Distortion Removal Example

Figure 14:
FIG. 14 are photographs illustrating geometric distortion correction using a test camera.

Referring now to FIG. 14, using the previously calibrated test camera discussed above, and from the proposed algorithm where lens geometric distortion is expressed as equation (16), FIG. 14 shows how lens distortion is removed from the image. Chromatic distortion is not visible on a black and white image.

3.4 Chromatic Distortion

Figure 15:
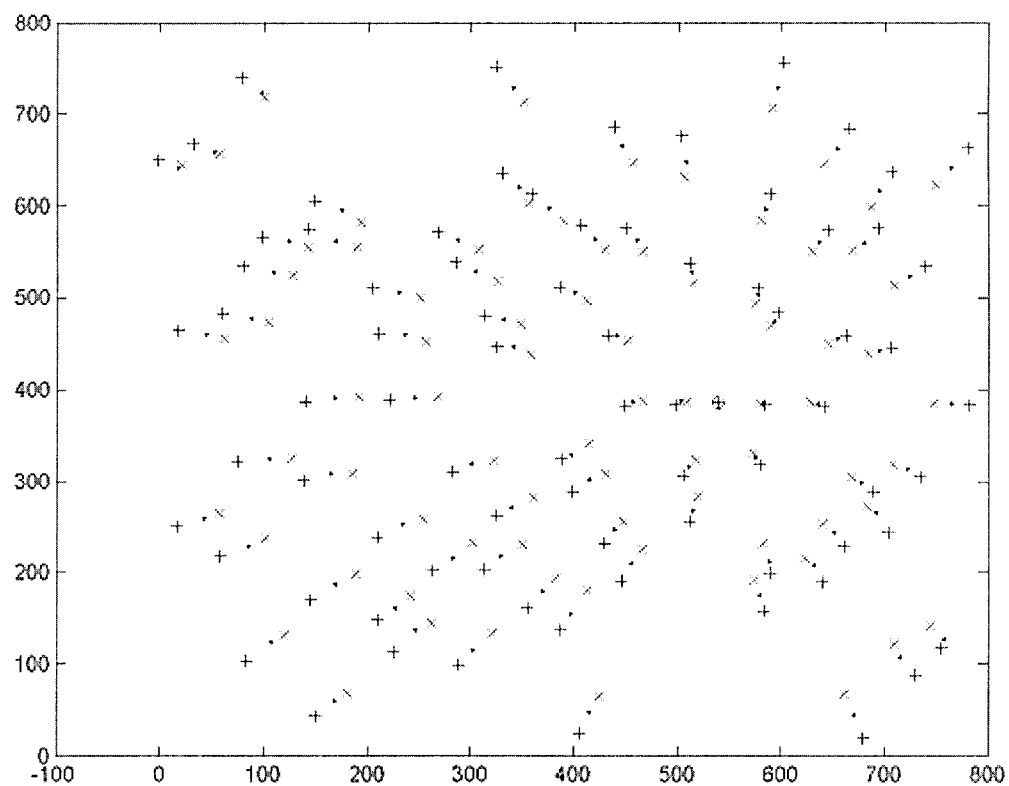
FIG. 15 is a graph illustrating chromatic distortion for a f=4 mm Cosmicar® C Mount lens.

Reference is now made to FIG. 15 illustrating chromatic distortion from a f=4 mm Cosmicar® C Mount lens, at a resolution of 1024×768. Once the true image center ($C_X$, $C_Y$) is known, chromatic distortion can be modeled. In most images, chromatic distortion is hardly visible, unless the subject is in full black and white and pictured with a colour camera. Reference [2] gives a model where each RGB color channel is modeled independently.

In FIG. 15, chromatic distortion target displacement is shown amplified by fifty (50) times. Target positions are shown for the Red Green and Blue (RGB) camera colour channels, and are grouped by clusters of three (3). The 'x' or cross sign marker symbol indicates the target extraction in Blue, the '+' or plus sign marker symbol indicates the target extraction in Red, and the dot or point marker symbol indicates the target extraction in Green. The visible spectrum spread pushes the Red target centres outwards, and the Blue target centers inwards with respect to Green. The graph of FIG. 15 shows a mostly radial behaviour. The imaginary lines joining Red Green and Blue centers for any given target location tend to line up and aim towards the image center indicated by the circled plus sign marker symbol close to the (500, 400) pixel coordinate.

Figure 16:
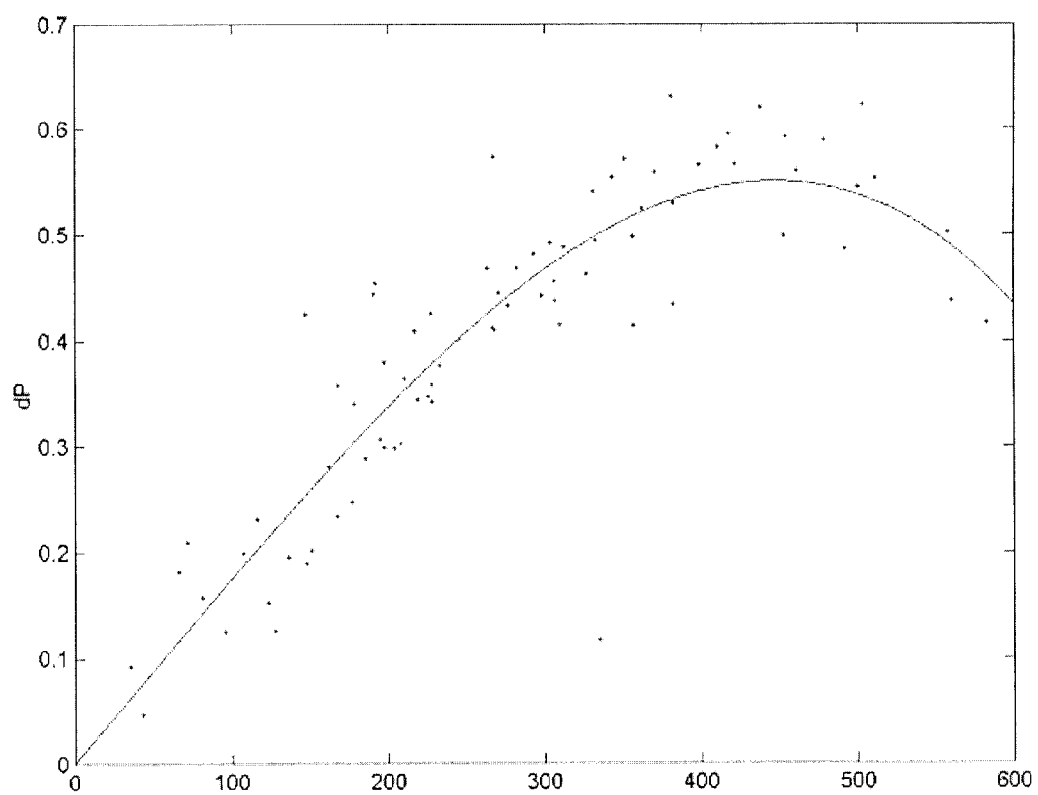
FIG. 16 is graph illustrating red chromatic distortion, radial correction vs distance from image center (pixels)
Figure 17:
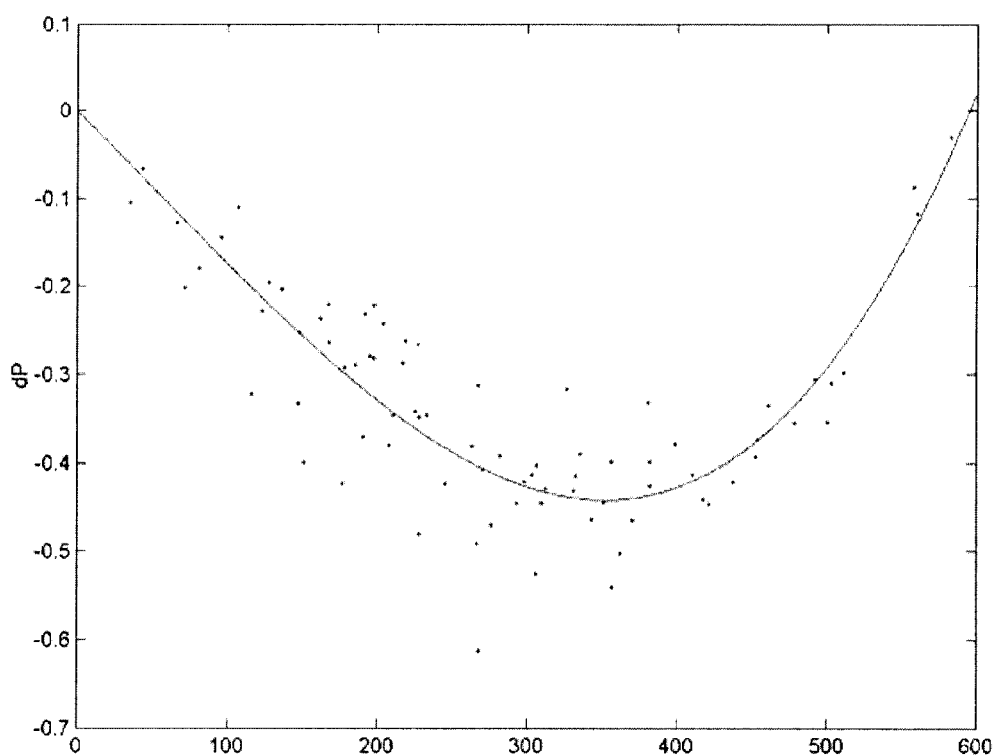
FIG. 17 is a graph illustrating blue chromatic distortion, radial correction vs distance from image center (pixels)

The next two (2) graphs, illustrated in FIG. 16 and FIG. 17, show that both Blue and Red chromatic distortions are zero at the image center, starting at ordinate origin (0,0) as expected. As the lens theoretical behaviour predicts, chromatic distortion should be zero at the image center.

Both chromatic Blue and Red distortions have their peak values at different radial distances from the center. From over ±½ pixel, chromatic distortion can be modeled and brought down to less than ±⅛ pixel.

In radial coordinates taken from the image center ($C_X$, $C_Y$), unaccounted chromatic distortion creates a ±½ pixel error on edge location with changing object colour, or changing light source spectrum. It stresses the need to be careful in extracting RGB from a Bayer pattern colour image since edge sensing is biased with colour.

3.5 Bayer Pattern Recovery

With reference now to FIG. 18, Bayer Pattern colour cameras give a single colour signal for each given pixel, Red, Green, or Blue, as indicated by an R, G, or B prefix in the pixel number of FIG. 18. Missing colour information is interpolated using neighbouring pixel information.

The most accurate Bayer pattern interpolation schemes use edge sensing to recover missing RGB information. We cannot interpolate across an edge since accurate Bayer pattern recovery needs to avoid discontinuities.

In a two-step process, we first compute the missing G pixel values on B and R pixels. For example, on red pixel R13, the missing G13 value is computed as:

$$(G12+G14)/2 \text{ if the edge is horizontal } (R13>(R3+R23)/2) \quad (11)$$

$$(G8+G18)/2 \text{ if the edge is vertical } (R13>(R11+R15)/2) \quad (12)$$

$$(G12+G8+G14+G18)/4 \text{ otherwise} \quad (13)$$

In step two, we compute missing B and R values using known G for edge sensing, assuming edges in B and R are geometrically found in the same image plane locations as G edges.

Since the lens introduces chromatic distortion, Bayer pattern recovery requires adapting to compensate for 'colour shifting' edge location as we scan from B to G to R pixels.

3.6 Optical System Design Tradeoffs

For surveillance, 3D telemetry, and scanners, the need to eliminate the camera calibration bias has been demonstrated. Other key assets for the technology include, but are not limited to:

1. A software approach creates an open integration architecture;
2. Allows the use of wide angle lenses or reduces lens size;
3. Allows to model a zooming lens camera;
4. Image geometric and chromatic distortion correction algorithms computation speed increases, and adds lossless image compression;
5. Remove a Bayer pattern recovery error caused by chromatic distortion.

It should be noted that software appears to be the only strategy to increase the accuracy beyond the capabilities of the camera hardware.

As an enabler, the technology allows:

The use of wide angle lenses to increase the camera angle of view without loss of accuracy. A ⅓ CCD f=4 mm combination gives a 90 degrees angle of view.

To compensate cameras' low resolution by adding chromatic distortion modeling and sub pixel edge measurement across the spectrum.

Miniaturization: We achieved calibration using a micro lens and focal distance evaluation accurate to $10^{-10}$ mm, roughly the size of a hydrogen molecule.

Sensor fusion between SWIR-Colour-synthetic images-Radar-LIDAR: to achieve accurate fusion, each image scale and image center has to be known and image distortion removed.

Digital image lag may cause nausea to a human observer making the proposed geometric distortion removal 4:1 simplification desirable. A residual 3D error from a calibration bias will also cause human discomfort, such as headaches or cybersickness. Testing vision amplification for soldier vision concludes that synthetic imaging lagging by ¼ sec on reality can make a human observer nauseous.

Since the solution is software implemented, it becomes cross platform independent.

On low resolution images, sub pixel edge extraction and plotting helps the human brain in interpreting the image. Low resolution SWIR images can fuse with higher resolution colour images.

In augmented reality, the computer generated image has ideal perspective and known focal length. Since a computer generated image is perfectly pinhole, created from set value for f, it stands from reason to correct the camera image for distortion and fit it to the same scale as the synthetic image.

In earth observation and surveillance from satellite, any lens system will exhibit distortion at some level. The earth's atmosphere also adds distortion which can only be compensated for when the lens distortion is accurately known. When stitching images, under-compensated geometric distortion will build up curvature, and biased perspective as caused by the tilted axis assumption will create a shape alteration: loss of squareness, loss of verticality . . . .

Sub pixel edge extraction is by far the most efficient means of image compression. Correcting the image for lens distortion and through a modification of JPEG, an added 30% lossless image compression was also demonstrated.

The proposed approach is desirable for zooming lens telemetry, increases speed and accuracy in wide angle lens application, and allows system miniaturization in two ways. Firstly by providing added accuracy from smaller lens systems, and secondly, filtering through software allows for simpler optics.

It provides the best trade-off for accuracy, speed, cost, bulk, weight, maintenance and upgradeability.

4.0 CONCLUSION

No automated system is more accurate than its instrument. The use of digital cameras as measuring tools in Intelligent Systems (IS) requires the camera to be calibrated.

Added accuracy is achievable only through software since commercial lenses can have a 10% tolerance on focal distance f, and software is the only way to compensate lens distortion at sub pixel level.

The tilted axis assumption creates a major bias and has to be replaced by a perspective model of the image plane that retains the camera image plane 3D geometry: horizontal and vertical image scales are equal and at right angle. The tilted axis assumption introduces a calibration bias showing on 3D triangulation since the image center is out of position. In the example discussed above, the two (2) pixel image center bias dominates every other error in the triangulation process since image features can be extracted to ¼ pixel accuracy.

Care should be taken in extracting image features for calibration since several sub pixel biases can occur. Sub pixel bias sources include, but are not restricted to:

Sub pixel edge location-orientation bias;
Sub pixel corner detection bias;
Unaccounted chromatic distortion;
Under compensated geometric distortion;
JPEG image filtering at sub pixel level.

The perspective model for the internal camera image plane is needed to locate the displacement of the lens focal point in a zooming lens. A software correction approach increases speed and accuracy in wide angle lens application, and allows system miniaturization in two ways. Firstly by providing added accuracy from smaller lens systems, and secondly, filtering through software allows for simpler optics. Software model/calibration is the only technique for improving camera performance beyond hardware limitations.

While illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment.

It should be noted that the present invention can be carried out as a method, can be embodied in a system, and/or on a computer readable medium. The embodiments of the invention described above are intended to be exemplary only. The scope of the invention is therefore intended to be limited solely by the scope of the appended claims.

REFERENCES

[1] Frédéric Devernay. *A Non-Maxima Suppression Method for Edge Detection with Sub-Pixel Accuracy*. INRIA: INSTITUT NATIONAL DE RECHERCHE EN INFORMATIQUE ET EN AUTOMATIQUE. Report No 2724, November 1995, 20 pages.
[2] Y. M. Harry Ng, C. P. Kwong. *Correcting the Chromatic Aberration in Barrel Distortion of Endoscopic Images*. Department of Automation and Computer Aided Engineering, Chinese University of Hong Kong. 6 pages
[3] Shawn Becker. *Semiautomatic Camera Lens Calibration from Partially Known Structure*. MIT: Massachusetts Institute of Technology. http://alumni.media.mitedu/~sbeck/results/Distortion/distortion.html©1994, 1995
[4] Konstantinos G. Derpanis. *The Harris Corner Detector*. October 2004, 2 pages.
[5] L. H. Hartley, P. Sturm. *Triangulation*. Proc. of the ARPA Image Understanding Workshop 1994, Monterey, Calif. 1994, pp. 957-966.

The invention claimed is:

1. A computer-implemented method for modeling an imaging device for use in calibration and image correction, the method comprising:

defining a first 3D orthogonal coordinate system having an origin located at a focal point of the imaging device, a first axis of the first coordinate system extending along a direction of a line of sight of the imaging device;

defining a second 3D orthogonal coordinate system having an origin located at a unitary distance from the focal point, a first axis of the second coordinate system extending along the direction of the line of sight, a second and a third axis of the second coordinate system substantially parallel to a second and a third axis of the first coordinate system respectively, the second and the third axis of the second coordinate system thereby defining a true scale plane square with the line of sight;

defining a third 3D coordinate system having an origin located at a focal distance from the focal point, a first axis of the third coordinate system extending along the direction of the line of sight, a second and a third axis of the third coordinate system respectively tilted by a first and a second angle relative to an orientation of the second and the third axis of the second coordinate system, the second and the third axis of the third coordinate system thereby defining an image plane off-squareness relative to the line of sight;

receiving a set of 3D coordinates associated with a point of a real world 3D object captured by the imaging device;

computing a projection of the point onto the true scale plane, thereby obtaining a first set of planar coordinates, and onto the image plane, thereby obtaining a second set of planar coordinates; and outputting the second set of planar coordinates indicative of a location of an image point corresponding to the point of the 3D object.

2. The method of claim 1, wherein the second coordinate system is defined such that the true scale plane establishes an entry to a lens system of the imaging device and the projection on the true scale plane expresses an output of an external model of the imaging device and the third coordinate system is defined such that the image plane establishes an output to the lens system and the projection on the image plane expresses an output of an internal model of the imaging device.

3. The method of claim 1, wherein the received set of 3D coordinates is $[x\ y\ z\ 1]^T$ and the projection of the point of the 3D object onto the true scale plane is computed as:

$$P_1[x\ y\ z\ 1]^T = \begin{bmatrix} 1 & 0 & 0 & 0 \\ 0 & 1 & 0 & 0 \\ 0 & 0 & 1 & 0 \\ 0 & 0 & 1 & 0 \end{bmatrix} \begin{bmatrix} x \\ y \\ z \\ 1 \end{bmatrix} = \begin{bmatrix} x \\ y \\ z \\ z \end{bmatrix} \approx \begin{bmatrix} x/z \\ y/z \\ 1 \\ 1 \end{bmatrix},$$

where $\approx$ is a scale equivalent operator and $P_1$ defines a projection operation onto the true scale plane with respect to the first coordinate system.

4. The method of claim 3, wherein the projection of the point of the 3D object onto the image plane is computed as:

$$P_f R(y, \beta) R(x, \alpha)[x\ y\ z\ 1]^T = \begin{bmatrix} 1 & 0 & 0 & 0 \\ 0 & 1 & 0 & 0 \\ 0 & 0 & 1 & 0 \\ 0 & 0 & 1/f & 0 \end{bmatrix}$$

$$\begin{bmatrix} \cos\beta & 0 & \sin\beta & 0 \\ 0 & 1 & 0 & 0 \\ -\sin\beta & 0 & \cos\beta & 0 \\ 0 & 0 & 0 & 1 \end{bmatrix} \begin{bmatrix} 1 & 0 & 0 & 0 \\ 0 & \cos\alpha & -\sin\alpha & 0 \\ 0 & \sin\alpha & \cos\alpha & 0 \\ 0 & 0 & 0 & 1 \end{bmatrix} \begin{bmatrix} x \\ y \\ z \\ 1 \end{bmatrix} = \begin{bmatrix} h_{11}x + h_{12}y + h_{13}z \\ h_{22}y + h_{23}z \\ h_{31}x + h_{32}y + h_{33}z \\ (1/f)(h_{31}x + h_{32}y + h_{33}z) \end{bmatrix} \approx$$

$$\begin{bmatrix} f(h_{11}x + h_{12}y + h_{13}z)/(h_{31}x + h_{32}y + h_{33}z) \\ f(h_{22}y + h_{23}z)/(h_{31}x + h_{32}y + h_{33}z) \\ f \\ 1 \end{bmatrix} =$$

-continued $$\begin{bmatrix} f(h_{11}x' + h_{12}y' + h_{13})/(h_{31}x' + h_{32}y' + h_{33}) \\ f(h_{22}y' + h_{23})/(h_{31}x' + h_{32}y' + h_{33}) \\ f \\ 1 \end{bmatrix} = [x'' \ y'' \ f \ 1]^T$$

where $P_f$ defines a projection operation onto the image plane, f is the focal distance, α is the first angle, β is the second angle, R(x, α) is an α rotation matrix with respect to an axis x of the image plane, the axis x defined as substantially parallel to the second axis of the second coordinate system before the α rotation is performed, R(y, β) is a β rotation matrix with respect to an axis y of the image plane, the axis y defined as substantially parallel to the third axis of the second coordinate system before the β rotation is performed, the α rotation computed rightmost such that the β rotation is performed relative to the axis x rotated by the angle α, and where
$h_{11}$=cos β,
$h_{12}$=sin θ sin α,
$h_{13}$=sin θ cos α,
$h_{22}$=cos α,
$h_{23}$=−sin α,
$h_{31}$=−sin β,
$h_{32}$=cos β sin α, and
$h_{33}$=cos β cos α.

5. The method of claim 4, further comprising determining a homography H between the true scale plane and the image plane as:

$$H = \begin{bmatrix} fh_{11} & fh_{12} & fh_{13} \\ 0 & fh_{22} & fh_{23} \\ h_{31} & h_{32} & h_{33} \end{bmatrix},$$

where $h_{31}$ and $h_{32}$ are non-zero elements applying a perspective correction to x and y scales in the image plane and the second set of planar coordinates (x", y") is a homographic transformation of a distorted position (x', y') of an image of the point on the true scale plane, the homographic transformation expressed as:

$[x''y''1]^T \approx [uvw]^T = H[x'y'1]^T,$ where u=f(cos βx'+sin β sin αy'+sin β cos α),
v=f(cos αy'−sin α),
w=−sin βx'+cos β sin αy'+cos β cos α,
x"=u/w+$C_X$, and
y"=v/w+$C_Y$ with ($C_X$,$C_Y$) being a position of the origin of the third coordinate system.

6. The method of claim 5, wherein the homography H is determined as:

$$H = \begin{bmatrix} f\cos\beta & f\sin\beta\sin\alpha & f\sin\beta\cos\alpha \\ 0 & f\cos\alpha & -f\sin\alpha \\ -\sin\beta & \cos\beta\sin\alpha & \cos\beta\cos\alpha \end{bmatrix} \sim \begin{bmatrix} f & f\alpha\beta & f\beta \\ 0 & f & -f\alpha \\ -\beta & \alpha & 1 \end{bmatrix}$$

where the approximation cos θ~1 and sin θ~θ is used for small angles α and β.

7. The method of claim 1, further comprising compensating for a distortion of a lens of the imaging device at the true scale plane, the compensating comprising applying a lens distortion model defined by:

$r'=r+k_1r^3+k_2r^5+\ldots,$ where the first set of planar coordinates comprises an undistorted position (x, y) of an image of the point on the true scale plane expressed in radial coordinates (r, θ), with $r^2=x^2+y^2$, tan θ=y/x, and at least one of x and y non-zero (x', y') represents a distorted position of (x, y) at an output of the lens before projection of the point on the image plane, r' is a distorted radial distance computed on the basis of (x', y'), and $k_1$ and $k_2$ are geometric distortion parameters of the lens.

8. A system for modeling an imaging device for use in calibration and image correction, the system comprising:
a memory;
a processor; and
at least one application stored in the memory and executable by the processor for
defining a first 3D orthogonal coordinate system having an origin located at a focal point of the imaging device, a first axis of the first coordinate system extending along a direction of a line of sight of the imaging device;
defining a second 3D orthogonal coordinate system having an origin located at a unitary distance from the focal point, a first axis of the second coordinate system extending along the direction of the line of sight, a second and a third axis of the second coordinate system substantially parallel to a second and a third axis of the first coordinate system respectively, the second and the third axis of the second coordinate system thereby defining a true scale plane square with the line of sight;
defining a third 3D coordinate system having an origin located at a focal distance from the focal point, a first axis of the third coordinate system extending along the direction of the line of sight, a second and a third axis of the third coordinate system respectively tilted by a first and a second angle relative to an orientation of the second and the third axis of the second coordinate system, the second and the third axis of the third coordinate system thereby defining an image plane off-squareness relative to the line of sight;
receiving a set of 3D coordinates associated with a point of a real world 3D object captured by the imaging device;
computing a projection of the point onto the true scale plane, thereby obtaining a first set of planar coordinates, and onto the image plane, thereby obtaining a second set of planar coordinates; and
outputting the second set of planar coordinates indicative of a location of an image point corresponding to the point of the 3D object.

9. The system of claim 8, wherein the at least one application is executable by the processor for defining the second coordinate system such that the true scale plane establishes an entry to a lens system of the imaging device and the projection on the true scale plane expresses an output of an external model of the imaging device and defining the third coordinate system such that the image plane establishes an output to the lens system and the projection on the image plane expresses an output of an internal model of the imaging device.

10. The system of claim 8, wherein the at least one application is executable by the processor for receiving the set of 3D coordinates as $[x\ y\ z\ 1]^T$ and computing the projection of the point of the 3D object onto the true scale plane as:

$$P_1[x\ y\ z\ 1]^T = \begin{bmatrix} 1 & 0 & 0 & 0 \\ 0 & 1 & 0 & 0 \\ 0 & 0 & 1 & 0 \\ 0 & 0 & 1 & 0 \end{bmatrix}\begin{bmatrix} x \\ y \\ z \\ 1 \end{bmatrix} = \begin{bmatrix} x \\ y \\ z \\ z \end{bmatrix} \approx \begin{bmatrix} x/z \\ y/z \\ 1 \\ 1 \end{bmatrix},$$

where $\approx$ is a scale equivalent operator, $P_1$ defines a projection operation onto the true scale plane with respect to the first coordinate system.

11. The system of claim 10, wherein the at least one application is executable by the processor for computing the projection of the point of the 3D object onto the image plane as:

$$P_f R(y,\beta)R(x,\alpha)[x\ y\ z\ 1]^T = \begin{bmatrix} 1 & 0 & 0 & 0 \\ 0 & 1 & 0 & 0 \\ 0 & 0 & 1 & 0 \\ 0 & 0 & 1/f & 0 \end{bmatrix}$$

$$\begin{bmatrix} \cos\beta & 0 & \sin\beta & 0 \\ 0 & 1 & 0 & 0 \\ -\sin\beta & 0 & \cos\beta & 0 \\ 0 & 0 & 0 & 1 \end{bmatrix}\begin{bmatrix} 1 & 0 & 0 & 0 \\ 0 & \cos\alpha & -\sin\alpha & 0 \\ 0 & \sin\alpha & \cos\alpha & 0 \\ 0 & 0 & 0 & 1 \end{bmatrix}\begin{bmatrix} x \\ y \\ z \\ 1 \end{bmatrix} = \begin{bmatrix} h_{11}x + h_{12}y + h_{13}z \\ h_{22}y + h_{23}z \\ h_{31}x + h_{32}y + h_{33}z \\ (1/f)(h_{31}x + h_{32}y + h_{33}z) \end{bmatrix} \approx$$

$$\begin{bmatrix} f(h_{11}x + h_{12}y + h_{13}z)/(h_{31}x + h_{32}y + h_{33}z) \\ f(h_{22}y + h_{23}z)/(h_{31}x + h_{32}y + h_{33}z) \\ f \\ 1 \end{bmatrix} =$$

$$\begin{bmatrix} f(h_{11}x' + h_{12}y' + h_{13})/(h_{31}x' + h_{32}y' + h_{33}) \\ f(h_{22}y' + h_{23})/(h_{31}x' + h_{32}y' + h_{33}) \\ f \\ 1 \end{bmatrix} = [x''\ y''\ f\ 1]^T$$

where $P_f$ defines a projection operation onto the image plane, f is the focal distance, $\alpha$ is the first angle, $\beta$ is the second angle, $R(x, \alpha)$ is an $\alpha$ rotation matrix with respect to an axis x of the image plane, the axis x defined as substantially parallel to the second axis of the second coordinate system before the $\alpha$ rotation is performed, $R(y, \beta)$ is a $\beta$ rotation matrix with respect to an axis y of the image plane, the axis y defined as substantially parallel to the third axis of the second coordinate system before the $\beta$ rotation is performed, the $\alpha$ rotation computed rightmost such that the $\beta$ rotation is performed relative to the axis x rotated by the angle $\alpha$, and where $h_{11}$=cos $\beta$,
$h_{12}$=sin $\beta$ sin $\alpha$,
$h_{13}$=sin $\beta$ cos $\alpha$,
$h_{22}$=cos $\alpha$,
$h_{23}$=−sin $\alpha$,
$h_{31}$=−sin $\beta$,
$h_{32}$=cos $\beta$ sin $\alpha$, and
$h_{33}$=cos $\beta$ cos $\alpha$.

12. The system of claim 11, wherein the at least one application is executable by the processor for determining a homography H between the true scale plane and the image plane as:

$$H = \begin{bmatrix} fh_{11} & fh_{12} & fh_{13} \\ 0 & fh_{22} & fh_{23} \\ h_{31} & h_{32} & h_{33} \end{bmatrix},$$

where $h_{31}$ and $h_{32}$ are non-zero elements applying a perspective correction to x and y scales in the image plane and the second set of planar coordinates (x", y") is a homographic transformation of a distorted position (x', y') of an image of the point on the true scale plane, the homographic transformation expressed as:

$[x''y''1]^T \approx [uvw]^T = H[x'y'1]^T$, where u=f(cos $\beta$x'+sin $\beta$ sin $\alpha$y'+sin $\beta$ cos $\alpha$),
v=f(cos $\alpha$y'−sin $\alpha$),
w=−sin $\beta$x'+cos $\beta$ sin $\alpha$y'+cos $\beta$ cos $\alpha$, x"=u/w+$C_X$, and
y"=v/w+$C_Y$ with ($C_X$,$C_Y$) being a position of the origin of the third coordinate system.

13. The system of claim 12, wherein the at least one application is executable by the processor for determining the homography H as:

$$H = \begin{bmatrix} f\cos\beta & f\sin\beta\sin\alpha & f\sin\beta\cos\alpha \\ 0 & f\cos\alpha & -f\sin\alpha \\ -\sin\beta & \cos\beta\sin\alpha & \cos\beta\cos\alpha \end{bmatrix} \sim \begin{bmatrix} f & f\alpha\beta & f\beta \\ 0 & f & -f\alpha \\ -\beta & \alpha & 1 \end{bmatrix}$$

where the approximation cos $\theta$~1 and sin $\theta$~0 is used for small angles $\alpha$ and $\beta$.

14. The system of claim 8, wherein the at least one application is executable by the processor for compensating for a distortion of a lens of the imaging device at the true scale plane, the compensating comprising applying a lens distortion model defined by:

$$r' = r + k_1 r^3 + k_2 r^5 + \ldots,$$

where the first set of planar coordinates comprises an undistorted position (x, y) of an image of the point on the true scale plane expressed in radial coordinates (r, θ), with $r^2 = x^2 + y^2$, tan θ=y/x, and at least one of x and y non-zero, (x', y') represents a distorted position of (x, y) at an output of the lens before projection of the point on the image plane, r' is a distorted radial distance computed on the basis of (x', y'), and $k_1$ and $k_2$ are geometric distortion parameters of the lens.

15. The system of claim 8, wherein the imaging device comprises one of a zooming lens camera, a near-infrared imaging device, a short-wavelength infrared imaging device, a long-wavelength infrared imaging device, a radar device, a light detection and ranging device, a parabolic mirror telescope imager, a surgical endoscopic camera, a Computed tomography scanning device, a satellite imaging device, a sonar device, and a multi spectral sensor fusion system.

16. A non-transitory computer readable medium having stored thereon program code executable by a processor for modeling an imaging device for use in calibration and image correction, the program code executable for:

defining a first 3D orthogonal coordinate system having an origin located at a focal point of the imaging device, a first axis of the first coordinate system extending along a direction of a line of sight of the imaging device;

defining a second 3D orthogonal coordinate system having an origin located at a unitary distance from the focal point, a first axis of the second coordinate system extending along the direction of the line of sight, a second and a third axis of the second coordinate system substantially parallel to a second and a third axis of the first coordinate system respectively, the second and the third axis of the second coordinate system thereby defining a true scale plane square with the line of sight;

defining a third 3D coordinate system having an origin located at a focal distance from the focal point, a first axis of the third coordinate system extending along the direction of the line of sight, a second and a third axis of the third coordinate system respectively tilted by a first and a second angle relative to an orientation of the second and the third axis of the second coordinate system, the second and the third axis of the third coordinate system thereby defining an image plane off-squareness relative to the line of sight;

receiving a set of 3D coordinates associated with a point of a real world 3D object captured by the imaging device;

computing a projection of the point onto the true scale plane, thereby obtaining a first set of planar coordinates, and onto the image plane, thereby obtaining a second set of planar coordinates; and outputting the second set of planar coordinates indicative of a location of an image point corresponding to the point of the 3D object.

* * * * *